United States Patent
Chen et al.

(10) Patent No.: US 12,519,572 B2
(45) Date of Patent: Jan. 6, 2026

(54) DATA TRANSMISSION METHOD, APPARATUS, AND SYSTEM

(71) Applicant: HUAWEI TECHNOLOGIES CO., LTD., Shenzhen (CN)

(72) Inventors: Ying Chen, Hangzhou (CN); Hejia Luo, Hangzhou (CN); Yunfei Qiao, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 737 days.

(21) Appl. No.: 18/041,780

(22) PCT Filed: Feb. 8, 2021

(86) PCT No.: PCT/CN2021/076087
§ 371 (c)(1),
(2) Date: Feb. 15, 2023

(87) PCT Pub. No.: WO2021/160101
PCT Pub. Date: Aug. 19, 2021

(65) Prior Publication Data
US 2023/0308219 A1 Sep. 28, 2023

(30) Foreign Application Priority Data
Feb. 10, 2020 (CN) .......................... 202010084578.5

(51) Int. Cl.
*H04L 1/1812* (2023.01)
(52) U.S. Cl.
CPC .................. *H04L 1/1812* (2013.01)
(58) Field of Classification Search
CPC ..... H04W 80/04; H04W 88/06; H04W 88/08; H04W 84/18; H04L 29/06; H04L 1/1812
(Continued)

(56) References Cited

U.S. PATENT DOCUMENTS

2007/0133479 A1* 6/2007 Montojo ........... H04W 52/0216
370/335
2010/0281322 A1* 11/2010 Park ..................... H04L 1/1825
714/E11.131
(Continued)

FOREIGN PATENT DOCUMENTS

CN 101288274 A 10/2008
CN 105262570 A 1/2016

OTHER PUBLICATIONS

3GPP TSG RAN WG1 Meeting #97, Reno, Nevada, USA, May 13-17, 2019, R1-1907757, Agenda Item: 7.2.5.4, Source: MediaTek Inc., Title: Summary for more delay-tolerant re-transmission mechanisms in NR-NTN. (Year: 2019).*
(Continued)

*Primary Examiner* — Asad M Nawaz
*Assistant Examiner* — Sanjay K Dewan
(74) *Attorney, Agent, or Firm* — Leydig, Voit & Mayer, Ltd.

(57) ABSTRACT

Embodiments of this application disclose a data transmission method, apparatus, and system, and relate to the communication field. This can flexibly configure a HARQ process to improve a data transmission throughput. A specific solution is: A network device sends a first transport block and a first identifier to a terminal. The first identifier is used to indicate whether to switch, from non-hybrid automatic repeat request HARQ transmission to HARQ transmission, a HARQ process in which the first transport block is located. The first identifier is occupied when the HARQ process uses the HARQ transmission. The terminal receives the first transport block and the first identifier from the network device. The first identifier is used to indicate whether to switch, from the non-hybrid automatic repeat request HARQ (Continued)

transmission to the HARQ transmission, the HARQ process in which the first transport block is located.

30 Claims, 10 Drawing Sheets

(58) Field of Classification Search
USPC .......................................................... 370/328
See application file for complete search history.

(56) References Cited

U.S. PATENT DOCUMENTS

| 2020/0229240 | A1* | 7/2020 | Zhang | H04B 7/0417 |
| 2022/0240312 | A1* | 7/2022 | Xu | H04L 5/0037 |
| 2023/0155743 | A1* | 5/2023 | Xu | H04L 5/0091 |
| | | | | 370/328 |
| 2023/0246537 | A1* | 8/2023 | Wu | H02M 3/157 |
| | | | | 323/235 |
| 2023/0254092 | A1* | 8/2023 | Kalamkar | H04L 5/0048 |
| | | | | 370/329 |

OTHER PUBLICATIONS

3GPP TSG RAN WG1 Meeting #96bis, Xi''an, China, Apr. 8-12, 2019, R1-1904859, Agenda Item: 7.2.5.4, Source: Inter Digital Inc., Title: Discussion on HARQ for NTN. (Year: 2019).*

3GPP TSG RAN WG1 Meeting #98bis, Chongqing, China, Oct. 14-20, 2019, R1-1911222, Source: Nokia, Nokia Shanghai Bell, Title: Considerations on HARQ in NTN, Agenda Item: 7.2.5.4. (Year: 2019).*

3GPP TSG RAN WG1 #98-Bis, Chongqing, China Oct. 14-20, 2019, R1-1910659, Source: Intel Corporation, Title: Discussion on HARQ for NTN, Agenda item: 7.2.5.4. (Year: 2019).*

Intel Corporation, "Discussion on HARQ for NTN," 3GPP TSG RAN WG1 #98-Bis, Chongqing, China, R1-1910659, total 4 pages, 3rd Generation Partnership Project, Valbonne, France (Oct. 14-20, 2019).

CATT, "Discussion on Reliability Improvement Mechanism for RRC_CONNECTED UEs in MBS," 3GPP TSG RAN WG1 #104-e, e-Meeting, R1-2100355, total 12 pages, 3rd Generation Partnership Project, Valbonne, France (Jan. 25-Feb. 5, 2020).

Nokia et al., "Considerations on HARQ in NTN," 3GPP TSG RAN WG1, Meeting #98bis, R1-1911222, Chongqing, China, Mobile Competence Centre; 650, Route Des Lucioles; F-06921 Sophia-Antipolis Cedex; France, XP051808882, Total 4 pages, 3rd Generation Partnership Program, Valbonne, France (Oct. 14-20, 2019).

Interdigital Inc., "Discussion on HARQ for NTN," 3GPP TSG RAN WG1 Meeting #96bis, R1-1904859, Xi'an. China, Mobile Competence Centre; 650, Route Lucioles; F-06921 Sophia-Antipolis Cedex; France, XP051691814, Total 5 pages, 3rd Generation Partnership Program, Valbonne (Apr. 8-12, 2019).

Mediatek Inc., "Summary for more delay-tolerant re-transmission mechanisms in NR-NTN," 3GPP TSG RAN WG1 Meeting #97, Reno, Nevada, USA, R1-1907757, Mediatek, Mobile Competence Centre; 650, Route Des Lucioles; F-06921 SO, XP051740031, Total 8 pages, 3rd Generation Partnership Program, Valbonne (May 13-17, 2019).

"Summary of 7.2.5.4 on more delay-tolerant re-transmission mechanisms in Nr-Ntn," 3GPP TSG RAN WG1 Meeting #99, R1-1913327, Reno, Nevada, US, MediaTek Inc., XP051830611, Total 14 pages, 3rd Generation Partnership Project, Valbonne, France (Nov. 18-22, 2019).

"Report of Email Discussion [106#71][NR/NTN] HARQ (Nomor)," 3GPP TSG-RAN WG2 Meeting #107, R2-1908987, Prague, CZ, Nomor Research GmbH, XP051766802, Total 18 pages, 3rd Generation Partnership Project, Valbonne, France (Aug. 26-30, 2019).

* cited by examiner

DATA TRANSMISSION METHOD, APPARATUS, AND SYSTEM

CROSS-REFERENCE TO RELATED APPLICATIONS

This application is a national stage of International Application No. PCT/CN2021/076087, filed on Feb. 8, 2021, which claims priority to Chinese Patent Application 202010084578.5, filed on Feb. 10, 2020. Both of the aforementioned applications are hereby incorporated by reference in their entireties.

TECHNICAL FIELD

This application relates to the communication field, and in particular, to a data transmission method, apparatus, and system.

BACKGROUND

Currently, hybrid automatic repeat request (HARQ) technology has been widely used in data transmission on a conventional land communication network. When the HARQ technology is used, a HARQ process may be set to ensure normal data transmission between a transmit end and a receive end. For example, the transmit end is a base station, and the receive end is a user equipment (UE). When receiving, through a transmission channel indicated by the HARQ process, a transport block (TB) sent by the base station, the UE may send an acknowledgment character (ACK) or a negative acknowledgment character (NACK) to the base station depending on whether the TB is correctly decoded. This helps the base station perform new data transmission (that is, send a new TB) based on the received ACK or retransmit the TB based on the received NACK. The existing HARQ technology complies with a stop-and-wait protocol. To be specific, after sending the TB by using the HARQ process, the base station temporarily stops data transmission based on the HARQ process, and performs next data transmission only after receiving an ACK or a NACK fed back by the UE for the TB. It may be understood that a longer waiting time between sending the TB and receiving the ACK or the NACK by the base station indicates a lower data throughput.

With the development of information technology, higher requirements are imposed on a communication process. Satellite communication has become an important part of global mobile communication due to characteristics such as a long distance, a large coverage area and flexible networking. If the HARQ technology in a conventional technology is applied to the satellite communication, a waiting time between sending a TB and receiving an ACK or a NACK by the base station is long because of a very long distance between the base station and the UE and a large delay of data transmission between the base station and the UE. This greatly reduces a data transmission throughput. To resolve this problem, the HARQ process may be set to HARQ transmission (enabling HARQ feedback, HARQe) or non-HARQ transmission (disabling HARQ feedback, HARQd). For example, when the HARQ process is set to HARQe, data transmission may be performed based on the foregoing solution. To be specific, the UE feeds back an ACK or a NACK depending on whether data is correctly decoded. The base station performs new data transmission (that is, sends new data) based on the ACK or retransmit the data based on the NACK. When the HARQ process is set to HARQd, the base station performs new data transmission regardless of whether the UE correctly decodes the data. In some scenarios that have a low requirement on a bit error rate of data, the HARQ process may be set to HARQd, to ensure that the base station directly performs new data transmission without waiting for receiving an ACK or a NACK corresponding to a sent TB. In this way, the data transmission throughput can be effectively improved.

Therefore, configuration on the HARQ process becomes essential for improving the data transmission throughput.

SUMMARY

Embodiments of this application provide a data transmission method, apparatus, and system. This can flexibly configure a HARQ process to improve a data transmission throughput.

To achieve the foregoing objective, the following technical solutions are used in embodiments of this application.

According to a first aspect, a data transmission method is provided. The method includes: A terminal receives a first transport block and a first identifier from a network device. The first identifier is used to indicate whether to switch, from non-hybrid automatic repeat request (HARQ) transmission to HARQ transmission, a HARQ process in which the first transport block is located. The first identifier is occupied when the HARQ process uses the HARQ transmission. According to this solution, the terminal may determine, based on the first identifier corresponding to the first transport block, whether to switch the corresponding HARQ process from HARQd to HARQe. Because the first identifier is occupied during HARQe, the first identifier is reused during HARQd. In this case, the HARQ process can be configured without additional signaling transmission. In some embodiments, the first identifier may be a physical layer identifier, so that configuration can be quickly implemented.

In a possible design, when the first identifier is flipped, the first identifier is used to indicate to switch the HARQ process from the non-HARQ transmission to the HARQ transmission; or when the first identifier is not flipped, the first identifier is used to indicate to switch the HARQ process from the non-HARQ transmission to the HARQ transmission. According to this solution, the HARQ process can be configured by flipping or not flipping the first identifier. For example, the first identifier may include information of one or more bits. For example, the first identifier includes one bit. When the first identifier is 1, a flipped first identifier is 0, and the first identifier that is not flipped is 1.

In a possible design, the method further includes: The terminal receives a radio resource control RRC message from the network device, where the RRC message is used to indicate that the HARQ process uses the non-HARQ transmission. According to this solution, the terminal may set the HARQ process to HARQd based on the received RRC message. For example, the terminal may set, based on the received RRC message, one or more HARQ processes to HARQd before data transmission starts. Alternatively, the terminal may set, based on the received RRC message, one or more HARQ processes to HARQd in a data transmission process. In this way, data transmission is performed by using HARQd during a next data transmission.

In a possible design, after the terminal receives the RRC message, the method further includes: The terminal sets the HARQ process to the non-HARQ transmission after a preset periodicity starting from a moment at which the RRC message is received. According to this solution, the terminal may restore the HARQ process to HARQd after a preset time after the HARQ process is set to HARQd based on the RRC message. In this way, after the HARQ process is set to HARQd, if the HARQ process is set to HARQe within the preset time, the terminal may determine again, based on the first identifier after the preset time, whether to switch the HARQ process from HARQd to HARQe. Therefore, flexibility of configuring the HARQ process can be effectively improved.

In a possible design, the method further includes: The terminal sets the HARQ process to the non-HARQ transmission after first preset duration starting from a moment at which the HARQ process is set to the HARQ transmission. According to this solution, after the first preset duration after the HARQ process is set to HARQe based on the RRC message or the first identifier, the first identifier may be used again to indicate whether to switch the HARQ process from HARQd to HARQe. Therefore, flexibility of configuring the HARQ process can be effectively improved.

In a possible design, the method further includes: The terminal maintains the HARQ process as the non-HARQ transmission within second preset duration after the HARQ process is set to the non-HARQ transmission. According to this solution, the terminal may maintain a status of the HARQ process unchanged after a period of time after the HARQ process is set to HARQd. A quantity of times of reconfiguring the HARQ process in a short period of time can be effectively reduced. This improves data transmission stability.

In a possible design, the first identifier is a new data indicator NDI. According to this solution, a physical layer identifier used when the HARQ process uses HARQd can be reused, to implement fast configuration of the HARQ process without wasting an identifier resource.

In a possible design, after the terminal receives the first transport block and the first identifier from the network device, the method further includes: When the first identifier is used to indicate to switch the HARQ process from the non-HARQ transmission to the HARQ transmission, the terminal sends, to the network device, a HARQ message used to indicate whether the first transport block is correctly decoded. According to this solution, when determining, based on the first identifier, to switch the HARQ process from HARQd to HARQe, the terminal may send an ACK/NACK message to the network device depending on whether the received TB is correctly decoded.

According to a second aspect, a data transmission method is provided. The method includes: A network device sends a first transport block and a first identifier to a terminal. The first identifier is used to indicate whether to switch, from non-hybrid automatic repeat request HARQ transmission to HARQ transmission, a HARQ process in which the first transport block is located. The first identifier is occupied when the HARQ process uses the HARQ transmission. According to this solution, the network device may indicate, based on the first identifier corresponding to the first transport block, the terminal whether to switch the corresponding HARQ process from HARQd to HARQe. Because the first identifier is occupied during HARQe, the first identifier is reused during HARQd. In this case, the HARQ process can be configured without additional signaling transmission. In some embodiments, the first identifier may be a physical layer identifier, so that configuration can be quickly implemented.

In a possible design, when the first identifier is flipped, the first identifier is used to indicate to switch the HARQ process from the non-HARQ transmission to the HARQ transmission; or when the first identifier is not flipped, the first identifier is used to indicate to switch the HARQ process from the non-HARQ transmission to the HARQ transmission. According to this solution, the HARQ process can be configured by flipping or not flipping the first identifier. For example, the first identifier may include information of one or more bits. For example, the first identifier includes one bit. When the first identifier is 1, a flipped first identifier is 0, and the first identifier that is not flipped is 1.

In a possible design, the method further includes: The network device sends a radio resource control RRC message to the terminal, where the RRC message is used to indicate that the HARQ process uses the non-HARQ transmission. According to this solution, the network device may set the HARQ process to HARQd based on the sent the RRC message. For example, the network device may set one or more HARQ processes to HARQd based on the sent RRC message before data transmission starts. Alternatively, the network device may set one or more HARQ processes to HARQd based on the sent RRC message in a data transmission process. In this way, data transmission is performed by using HARQd during a next data transmission.

In a possible design, after the network device sends the RRC message, the method further includes: The network device sets the HARQ process to the non-HARQ transmission after a preset periodicity starting from a moment at which the RRC message is sent. According to this solution, the network device may restore the HARQ process to HARQd after a preset time after the HARQ process is set to HARQd based on the RRC message. In this way, after the HARQ process is set to HARQd, if the HARQ process is set to HARQe within the preset time, after the preset time, the network device may reconfigure, based on the first identifier, whether to switch the HARQ process from HARQd to HARQe. Therefore, flexibility of configuring the HARQ process can be effectively improved.

In a possible design, the method further includes: The network device sets the HARQ process to the non-HARQ transmission after first preset duration starting from a moment at which the HARQ process is set to the HARQ transmission. According to this solution, after the first preset duration after the HARQ process is set to HARQe based on the RRC message or the first identifier, the first identifier may be used again to indicate whether to switch the HARQ process from HARQd to HARQe. Therefore, flexibility of configuring the HARQ process can be effectively improved.

In a possible design, the method further includes: The network device maintains the HARQ process as the non-HARQ transmission within second preset duration after the HARQ process is set to the non-HARQ transmission. According to this solution, the network device may maintain a status of the HARQ process unchanged after a period of time after the HARQ process is set to HARQd. A quantity of times of reconfiguring the HARQ process in a short period of time can be effectively reduced. This improves data transmission stability.

In a possible design, the first identifier is a new data indicator NDI. According to this solution, a physical layer identifier used when the HARQ process uses HARQd can be reused, to implement fast configuration of the HARQ process without wasting an identifier resource.

In a possible design, when the first identifier is used to indicate to switch the HARQ process from the non-HARQ transmission to the HARQ transmission, the method further includes: The network device receives a HARQ message, where the HARQ message is used to indicate whether the first transport block is correctly decoded. The network device resends the first transport block to the terminal when the first transport block is not correctly decoded, or the network device sends a second transport block to the terminal when the first transport block is correctly decoded, where the second transport block is different from the first transport block. According to this solution, when the network device switches the HARQ process from HARQd to HARQe based on the first identifier, the network device may perform new data transmission or data retransmission based on a received ACK/NACK fed back by the terminal.

According to a third aspect, a data transmission apparatus is provided. The apparatus includes a receiving unit. The receiving unit is configured to receive a first transport block and a first identifier from a network device. The first identifier is used to indicate whether to switch, from non-hybrid automatic repeat request HARQ transmission to HARQ transmission, a HARQ process in which the first transport block is located. The first identifier is occupied when the HARQ process uses the HARQ transmission.

In a possible design, when the first identifier is flipped, the first identifier is used to indicate to switch the HARQ process from the non-HARQ transmission to the HARQ transmission; or when the first identifier is not flipped, the first identifier is used to indicate to switch the HARQ process from the non-HARQ transmission to the HARQ transmission.

In a possible design, the receiving unit is further configured to receive a radio resource control RRC message from the network device, where the RRC message is used to indicate that the HARQ process uses the non-HARQ transmission.

In a possible design, the apparatus further includes a configuration unit. The configuration unit sets the HARQ process to the non-HARQ transmission after a preset periodicity starting from a moment at which the RRC message is received.

In a possible design, the apparatus further includes a configuration unit. The configuration unit is configured to set the HARQ process to the non-HARQ transmission after first preset duration starting from a moment at which the HARQ process is set to the HARQ transmission.

In a possible design, the configuration unit is configured to maintain the HARQ process as the non-HARQ transmission within second preset duration after the HARQ process is set to the non-HARQ transmission.

In a possible design, the first identifier is a new data indicator NDI.

In a possible device, the apparatus further includes a sending unit. The sending unit is configured to: after the terminal receives the first transport block and the first identifier from the network device, when the first identifier is used to indicate to switch the HARQ process from the non-HARQ transmission to the HARQ transmission, send to the network device, a HARQ message used to indicate whether the first transport block is correctly decoded.

According to a fourth aspect, a data transmission apparatus is provided. The apparatus includes a sending unit. The sending unit is configured to send a first transport block and a first identifier to a terminal, where the first identifier is used to indicate whether to switch a HARQ process from non-HARQ transmission to HARQ transmission. The first identifier is occupied when the HARQ process uses the HARQ transmission.

In a possible design, when the first identifier is flipped, the first identifier is used to indicate to switch the HARQ process from the non-HARQ transmission to the HARQ transmission; or when the first identifier is not flipped, the first identifier is used to indicate to switch the HARQ process from the non-HARQ transmission to the HARQ transmission.

In a possible design, the sending unit is further configured to send a radio resource control RRC message to the terminal, where the RRC message is used to indicate that the HARQ process uses the non-HARQ transmission.

In a possible design, the apparatus further includes a configuration unit. The configuration unit is configured to set the HARQ process to the non-HARQ transmission after a preset periodicity starting from a moment at which the RRC message is sent.

In a possible design, the apparatus further includes a configuration unit. The configuration unit is configured to set the HARQ process to the non-HARQ transmission after first preset duration starting from a moment at which the HARQ process is set to the HARQ transmission.

In a possible design, the configuration unit is further configured to maintain the HARQ process as the non-HARQ transmission within second preset duration after the HARQ process is set to the non-HARQ transmission.

In a possible design, the first identifier is a new data indicator NDI.

In a possible design, the apparatus further includes a receiving unit. The receiving unit is configured to receive a HARQ message, where the HARQ message is used to indicate whether the first transport block is correctly decoded. The sending unit is further configured to: resend the first transport block to the terminal when the HARQ message is used to indicate the first transport block is not correctly decoded, or send a second transport block to the terminal when the HARQ message is used to indicate the first transport block is correctly decoded, where the second transport block is different from the first transport block.

According to a fifth aspect, a data transmission apparatus is provided. The data transmission apparatus includes one or more processors, and the one or more processors are coupled to one or more memories. The one or more memories store computer instructions. When the one or more processors execute the computer instructions, the data transmission apparatus is enabled to perform the data transmission method according to any one of the first aspect and the possible designs of the first aspect.

According to a sixth aspect, a data transmission apparatus is provided. The data transmission apparatus includes one or more processors, and the one or more processors are coupled to one or more memories. The one or more memories store computer instructions. When the one or more processors execute the computer instructions, the data transmission apparatus is enabled to perform the data transmission method according to any one of the second aspect and the possible designs of the second aspect.

According to a seventh aspect, a chip is provided. The chip includes an input interface, a processing circuit, and an output interface. The processing circuit is configured to invoke, from a storage medium, a computer program stored in the storage medium and run the computer program, to perform the data transmission method according to any one of the first aspect and the possible designs of the first aspect.

According to an eighth aspect, a chip is provided. The chip includes an input interface, a processing circuit, and an output interface. The processing circuit is configured to invoke, from a storage medium, a computer program stored in the storage medium and run the computer program, to perform the data transmission method according to any one of the second aspect and the possible designs of the second aspect.

According to a ninth aspect, a computer-readable storage medium is provided. The computer-readable storage medium includes computer instructions, and when the computer instructions are run, the data transmission method according to any one of the first aspect and the possible designs of the first aspect.

According to a tenth aspect, a computer-readable storage medium is provided. The computer-readable storage medium includes computer instructions, and when the computer instructions are run, the data transmission method according to any one of the second aspect and the possible designs of the second aspect.

According to an eleventh aspect, a data transmission system is provided. The data transmission system includes the data processing apparatuses according to the fifth aspect and the sixth aspect.

For example, any design manner of the third aspect to the eleventh aspect may correspond to the first aspect and any possible design of the first aspect or the second aspect and any possible design of the second aspect. In this case, similar technical effects can be brought. Details are not described herein again.

BRIEF DESCRIPTION OF DRAWINGS

FIG. 7 is a schematic diagram of a configuration process of a HARQ process according to an embodiment of this application;

FIG. 8 is a schematic diagram of another configuration process of a HARQ process according to an embodiment of this application;

DESCRIPTION OF EMBODIMENTS

On a conventional land communication network, data transmission by using a HARQ technology can effectively improve data transmission reliability. For example, a receive end may decode a received TB. When decoding fails, the receive end may send a retransmission request to a transmit end, so that the transmit end retransmits the TB. The receive end may store the TB that is incorrectly decoded in a HARQ buffer, and store a received retransmitted TB in the same HARQ buffer (that is, perform soft combination), to obtain a data packet that is more reliable than a data packet that is only decoded. The receive end may decode the data packet in the HARQ buffer, to obtain corresponding decoded data. If the decoding still fails, the receive end may repeatedly perform the foregoing process. Because the data packet obtained by soft combination is more reliable than the single TB, a probability of successful decoding is higher. This can effectively improve the data transmission reliability.

In an example, in the HARQ technology, the receive end may determine, through a cyclic redundancy check (CRC), whether the received data packet is successfully decoded. If the CRC succeeds, it indicates that decoding succeeds, and the receive end may send an ACK to the transmit end. If the CRC fails, it indicates that decoding fails, and the receive end may send a NACK to the transmit end.

Figure 1:
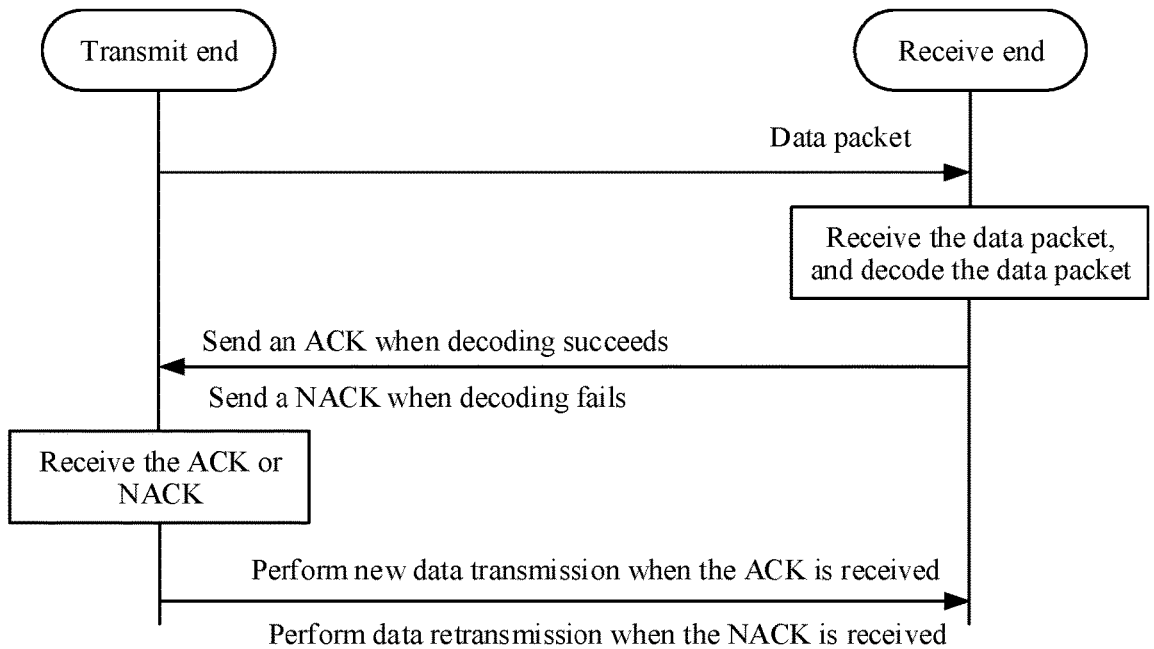
FIG. 1 is a schematic flowchart of data transmission by using a HARQ technology according to the conventional technology.

The following describes a process of data transmission by using the HARQ technology in detail. FIG. 1 is a schematic flowchart of data transmission by using the HARQ technology. As shown in FIG. 1, a transmit end may send a data packet to a receive end. Correspondingly, the receive end may receive the data packet, and decode the data packet. The receive end may feed back an ACK/NACK to the transmit end depending on whether decoding succeeds, so that the transmit end transmits a new data packet based on the received ACK, or retransmits the data packet based on the received NACK. For example, when decoding succeeds, the receive end sends the ACK, and the transmit end receives the ACK, and performs new data transmission. For another example, when decoding fails, the receive end sends the NACK, and the transmit end receives the NACK and performs data retransmission.

Figure 2:
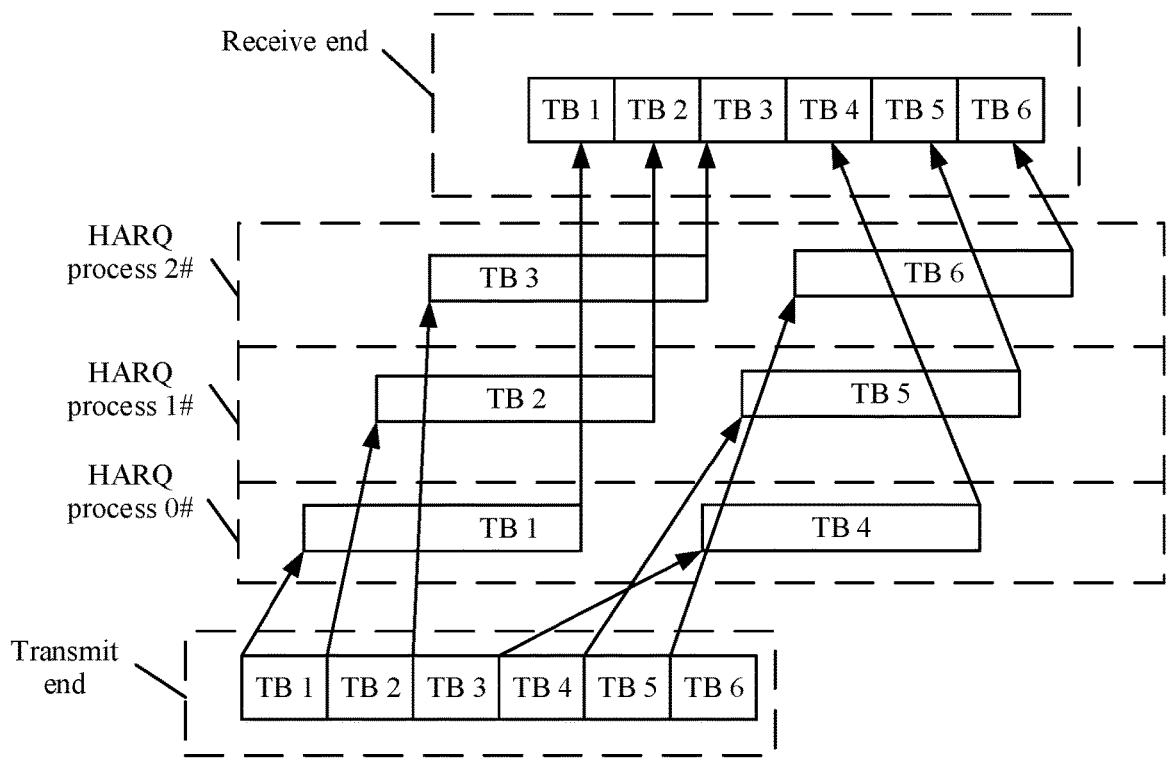
FIG. 2 is a schematic diagram of data transmission by using a plurality of HARQ processes in parallel according to the conventional technology.

Generally, most data that needs to be sent is a consecutive data stream. During transmission of the data stream by using the HARQ technology, the transmit end may divide the data stream into a plurality of TBs, and transmit the TBs in a specific time sequence. After receiving the plurality of TBs, the receive end may decode and reorganize the plurality of TBs, to obtain the corresponding consecutive data stream. For example, an example of data transmission is used. In the data transmission, a data stream is divided into six transport blocks (for example, TB 1, TB 2, TB 3, TB 4, TB 5, and TB 6), and three HARQ processes (for example, HARQ process 0#, HARQ process 1#, and HARQ process 2#) are configured. As shown in FIG. 2, the transmit end may send, in a time sequence, the TB 1 to the receive end by using the HARQ process 0#, the TB 2 to the receive end by using the HARQ process 1#, and the TB 3 to the receive end by using the HARQ process 2#. The receive end may receive the TB 1, the TB 2, and the TB 3 in a sequence, and separately perform decoding processing on the TB 1, the TB 2, and the TB 3. When the TB 1, the TB 2, and the TB 3 are successfully decoded, the receive end may feed back an ACK to the transmit end by using the corresponding HARQ process, so that the transmit end continues performing data transmission by using the three HARQ processes. For example, as shown in FIG. 2, the transmit end may send, in the time sequence, the TB 4 to the receive end by using the HARQ process 0#, the TB 5 to the receive end by using the HARQ process 1#, and the TB 6 to the receive end by using the HARQ process 2#. If the TB 4, the TB 5, and the TB 6 are all successfully decoded, the receive end may reorganize the TB 1, the TB 2, the TB 3, the TB 4, the TB 5, and the TB 6 in a receiving time sequence, to obtain the consecutive data stream.

It should be noted that, in a process of data transmission by using the HARQ process, other signaling interaction is needed to ensure normal data transmission during the data transmission. For example, the data transmission is downlink transmission, that is, the transmit end is a base station, and the receive end is UE. The base station may send downlink control information (DCI) to the UE. The downlink control information may include a plurality of identifiers, used to indicate related information of the data transmission. For example, the identifiers related to the HARQ process in the DCI are shown in Table 1.

TABLE 1

| DCI identifier related to the HARQ process | Format 1-0 (bits) | Format 1-1 (bits) |
| --- | --- | --- |
| HARQ process number | 4 | 4 |
| New data indicator | 1 | 1 |
| Redundancy version | 2 | 2 |
| Downlink assignment index | 2 | 0, 2, 4 |
| TPC command for scheduled physical uplink control channel | 2 | 2 |
| Physical uplink control channel resource identifier | 3 | 3 |
| HARQ feedback timing indicator | 3 | 0, 1, 2, 3 |

In an actual use process, one of format 1-0 or format 1-1 may be selected for DCI configuration. The format 1-0 is used as an example.

The HARQ process number may be 4 bits, and indicate a process number of current data. A maximum process number is 16, and the process number is used by the terminal to identify a process to which the current data belongs.

The new data indicator (NDI) may be 1 bit, and indicate the current data is newly transmitted data or retransmitted data. For example, when the current data is the newly transmitted data, the base station may flip the NDI when sending the DCI, so that the terminal determines, based on a flipped NDI, that the current data is the newly transmitted data. On the contrary, when the current data is the retransmitted data, when sending the DCI, the base station may maintain the NDI consistent with an NDI used in last data sending, that is, may not flip the NDI, so that the terminal determines, based on the NDI that is not flipped, that the current data is the retransmitted data.

The redundancy version (RV) may include 2-bit information. Content of bits of each retransmission does not necessarily need to be the same as that of the first transmission. The transmit end generates a plurality of different bit sets (but carrying same information) based on the same TB. One redundancy version is sent per retransmission, but a plurality of redundancy versions can be combined for decoding. Each time, the transmit end notifies the user of the version of the data to be transmitted, which is used for soft combination and decoding of the terminal.

The downlink assignment index (DAI) may include 2-bit information. When a user feeds back a plurality of pieces of downlink data in one slot, the DAI is used to indicate and assist the UE to perform HARQ-ACK feedback. A physical meaning of the DAI is to count downlink scheduling fed back in the same slot. The DAI has only two bits, and indicates a maximum quantity of four. If a quantity of the scheduling is greater than 4, the DAI continues cyclically counting from '00'. The UE needs to identify this situation and perform correct counting, to determine a quantity of bits finally fed back.

The TPC command for scheduled physical uplink control channel (TPC command for scheduled PUCCH) may include 2-bit information, and is used to indicate a power adjustment for ACK feedback in uplink control. For example, two bits may represent four power adjustments.

The physical uplink control channel resource identifier (PUCCH resource indicator identifier) may include 3-bit information. The 3-bit information is used to indicate a resource location occupied by the ACK feedback in uplink control, for example, a symbol number for feedback, a quantity of symbols occupied, a relative frequency domain location; and includes eight types of resource configurations.

The physical downlink shared channel-to-HARQ feedback timing indicator (PDSCH-to-HARQ feedback timing indicator) may include 3-bit information to determine a slot for the ACK feedback. The terminal may calculate, based on a value indicated by the field, a quantity of slots after which the ACK feedback is performed.

Certainly, the DCI may further include another identifier in addition to the foregoing identifier. Table 1 is merely an example for description. This is not limited herein in this embodiment of this application. It should be noted that one piece of DCI may be used to indicate transmission information of one transport block, or may be used to indicate transmission information of a plurality of transport blocks. When one piece of DCI corresponds to one transport block, the DCI may be sent together with the transport block.

It can be learned that data transmission by using the HARQ technology can effectively improve data transmission reliability. However, there are still some problems.

For example, when the existing HARQ technology is applied to satellite communication with a longer transmission path, for each HARQ process, data transmission efficiency of one HARQ process is lower than that on a common land transmission network because a decoding result of previous data needs to be waited for during each data sending. In this case, a throughput of an entire transmission system is significantly affected.

Figure 3:
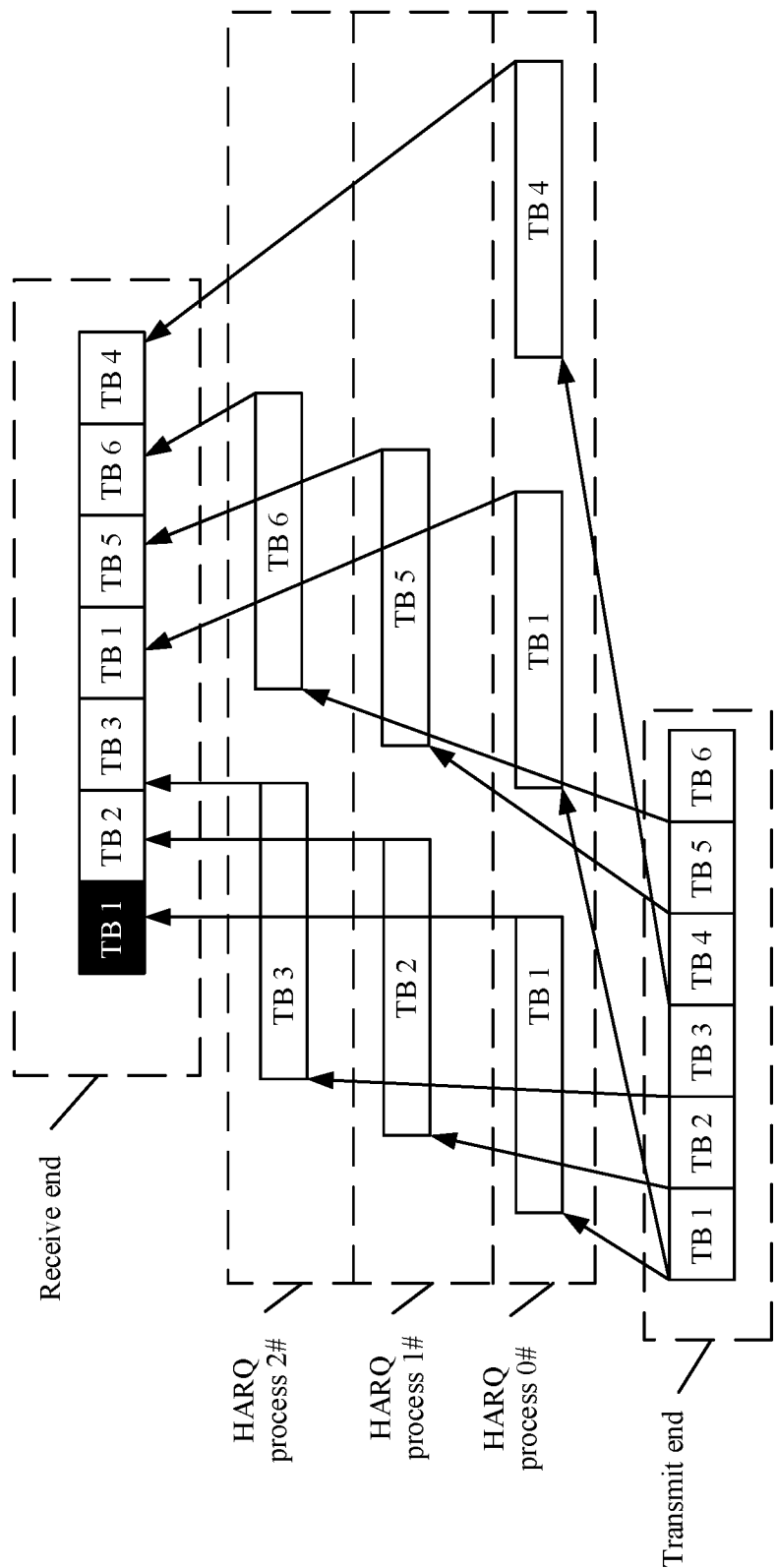
FIG. 3 is another schematic diagram of data transmission by using a plurality of HARQ processes in parallel according to the conventional technology.

In addition, when one or more TBs fail to be decoded, a problem occurs in reorganizing data by the receive end. For example, an example of data transmission is still used. In the data transmission, a data stream is divided into six transport blocks (for example, TB 1, TB 2, TB 3, TB 4, TB 5, and TB 6), and three HARQ processes (for example, HARQ process 0#, HARQ process 1#, and HARQ process 2#) are configured. As shown in FIG. 3, after the TB 1 is sent by using the HARQ process 0# for a first time, when decoding fails at the receive end, the receive end feeds back a NACK to the transmit end, so that the transmit end may retransmit the TB 1 next time when sending data by using the HARQ process 0#. After decoding, the receive end obtains TB 1-TB 2-TB 3-TB 4-TB 5-TB 6 in a preset time sequence. However, because the TB 1 is retransmitted by using the HARQ process 0#, after decoding, the receive end obtains the transport blocks in a sequence of TB 1-TB 2-TB 3-TB 1-TB 5-TB 6-TB 4. Obviously, in a data transmission process, if data is retransmitted, a sequence of transport blocks received by the receive end is abnormal. In this case, the receive end cannot normally reorganize data to obtain a data stream sent by the transmit end. To resolve this problem, a more complex reorganization mechanism needs to be set at the receive end, so that transport blocks successfully decoded can be correctly reorganized.

The HARQ process may be set to HARQd to resolve a low throughput caused by a long delay. In this way, in a data scenario with a low requirement for a bit error rate, the transmit end performs new data transmission during each data transmission, and continues performing data transmission without waiting for a decoding status of last transmitted data. In addition, when the HARQ process is set to HARQd, because no data is retransmitted, no problem occurs in the time sequence of the transport blocks received by the receive end.

Certainly, data sent by using the HARQ process at different moments is different, to be specific, when the TB 1 is sent, the HARQ process needs to be set to HARQd, and when the TB 2 is sent, the HARQ process may need to be set to HARQe. In this case, the HARQ process needs to be flexibly set to HARQe or HARQd, so that during transmission of different data, whether to perform data retransmission can be flexibly controlled, to improve the throughput of the entire system.

Currently, the HARQ process may be configured by using a radio resource control (RRC) message. For example, the base station may send an RRC message to the UE, to indicate the UE to set a corresponding HARQ process to HARQd or HARQe. However, because of a long delay of the RRC message and a long-distance transmission path in satellite communication, scheduling is not flexible enough and a delay is obvious when the HARQ process is configured based on the RRC message.

In addition, a new identifier may be added to a control channel, to indicate to set the HARQ process to HARQe or HARQd. However, when a fixed flag bit is used to configure the HARQ process, a flag bit resource in the control channel may be wasted.

Embodiments of this application provide a data transmission method, so that a HARQ process can be flexibly configured without resource waste. Embodiments of this application are described in detail below with reference to the accompanying drawings.

Figure 4:
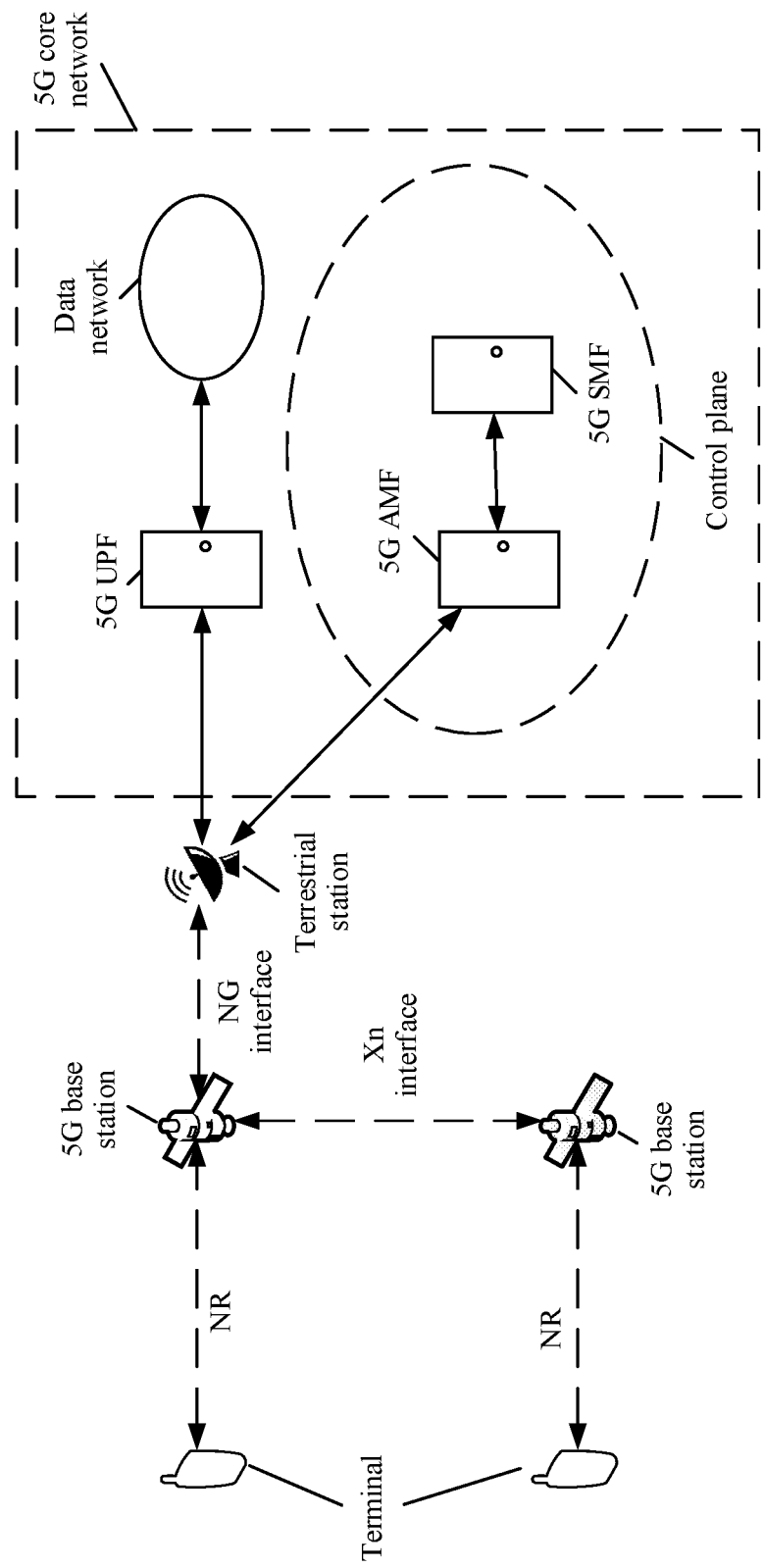
FIG. 4 is a schematic diagram of a network architecture according to an embodiment of this application.

An embodiment of this application provides a network architecture. The network architecture may include a terminal, a base station, a terrestrial station, a user plane processing unit (User Plane Function, UPF), and a control plane device including an access and access and mobility management unit (Access and Mobility Management Function, AMF), and a session management unit (Session Management Function, SMF). The UPF, AMF, and SMF may form a core network. For example, when the network architecture is used for 5G communication, a corresponding device may be a 5G device. For example, as shown in FIG. 4, the network architecture may include a terminal, a 5G base station, a terrestrial station, a 5G UPF, a 5G AMF, and a 5G SMF. The 5G UPF, 5G AMF, and 5G SMF form a 5G core network. The following uses the network architecture shown in FIG. 4 as an example for description.

In the network architecture, a terminal (for example, a UE) may access a network by using 5G new radio (NR). In a satellite communication system, a 5G base station is deployed on a satellite, and is connected to a 5G core network via a terrestrial station through a wireless network. In addition, there is a radio link for communication through the wireless network between 5G base stations on satellites, to implement communication between base stations, for example, signaling exchange and user data transmission between base stations.

The terminal is a mobile device capable of supporting the NR, for example, a mobile phone and a tablet computer. The terminal can access a satellite network by using the NR and implement services such as calling and internet access. The 5G base station is mainly configured to provide a radio access service, schedule a radio resource to an access terminal, and provide a reliable radio transmission protocol, a data encryption protocol, and the like. The terrestrial station may be configured to forward signaling and service data between the satellite base station and the 5G core network. The network architecture shown in FIG. 4 may include a plurality of interfaces and communication links. For example, the 5G new radio is a radio link between a terminal and a base station. An Xn interface is an interface between a 5G base station and a base station, and is mainly used for signaling exchange such as handover. An NG interface is an interface between a 5G base station and the 5G core network, and exchanges mainly user service data and signaling such as NAS of the core network.

The 5G core network may be configured to provide services such as user access control, mobility management, session management, user security authentication, and accounting. For example, the 5G core network may include a plurality of functional units. For example, the 5G core network may be divided into a control plane function entity and a data plane function entity. An AMF on a control plane may be configured to be responsible for user access management, security authentication, and mobility management. A UPF on a data plane may be configured for functions such as user plane data transmission management, traffic statistics collection, and lawful interception.

It should be noted that, in some embodiments, a terminal and/or a base station may be further divided into a plurality of protocol stack layers, to implement data communication between the terminal and the base station (for example, a 5G base station). For example, the divided protocol stack layers may be determined based on a radio interface protocol. Because the radio interface protocol needs to carry both user plane data and control plane data, the protocol stack layers may include a user plane protocol stack and a control plane protocol stack. For example, as shown in FIG. 5(*a*), the user plane protocol stack includes, from a lower layer to an upper layer, a physical layer (PHY), a media access control (MAC), a radio link control (RLC), and a packet data convergence protocol (PDCP). The user plane protocol stack may be disposed in both the terminal and the base station. As shown in FIG. 5(*b*), a physical layer, a media access control, a radio link control, a packet data convergence protocol, and a radio resource control may be set in the control plane protocol stack of both the terminal and the base station. In addition, the terminal side may further include a non-access stratum (NAS) configured to perform data exchange with a mobility management entity (MME).

Figure 5A:
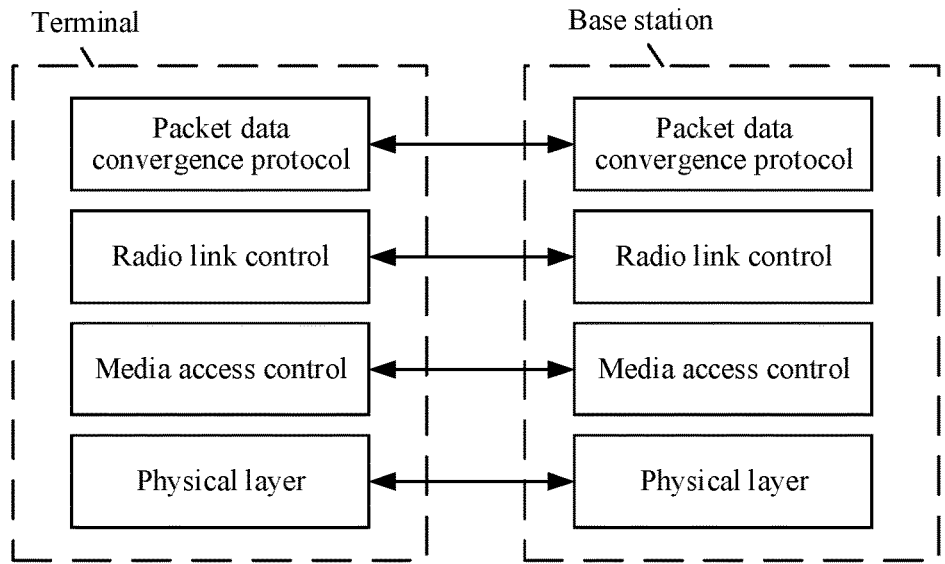
FIG. 5(a) and FIG. 5(b) are schematic diagrams of composition of protocol stack layers according to an embodiment of this application.
Figure 5B:
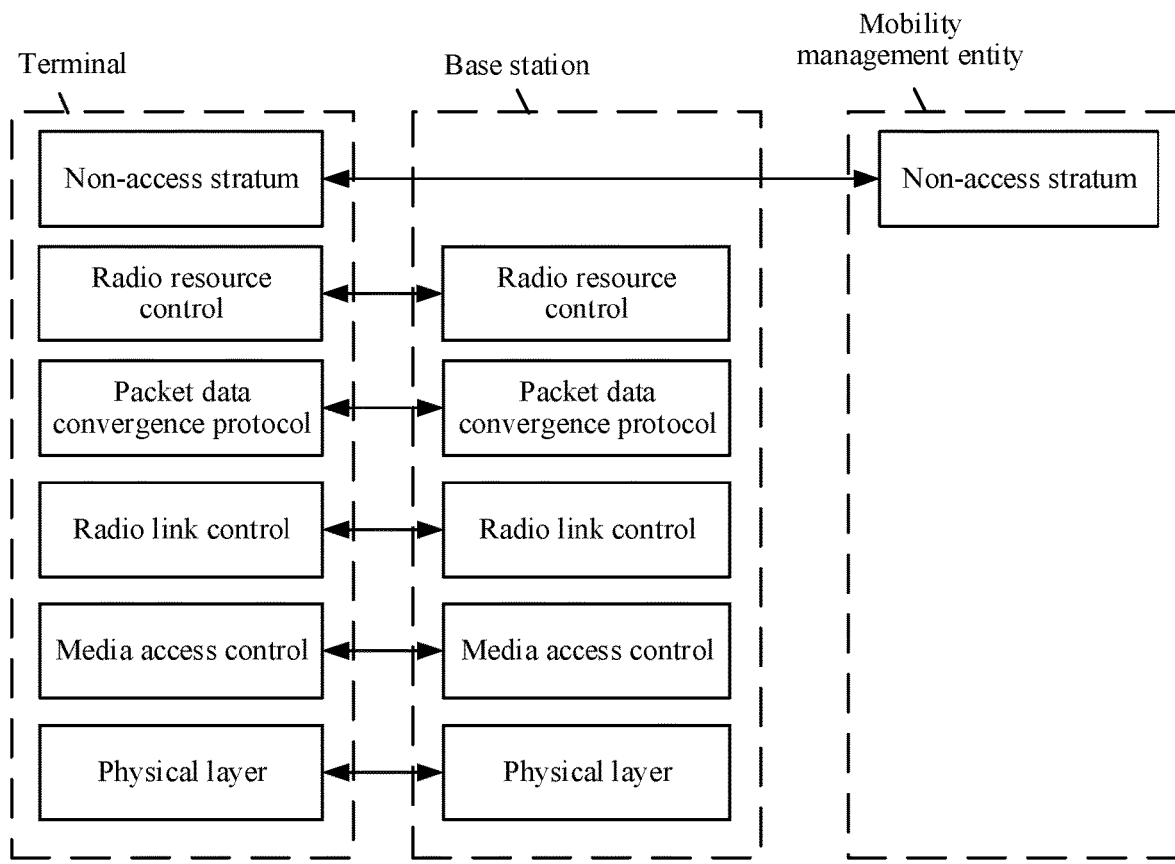
Figure 6:
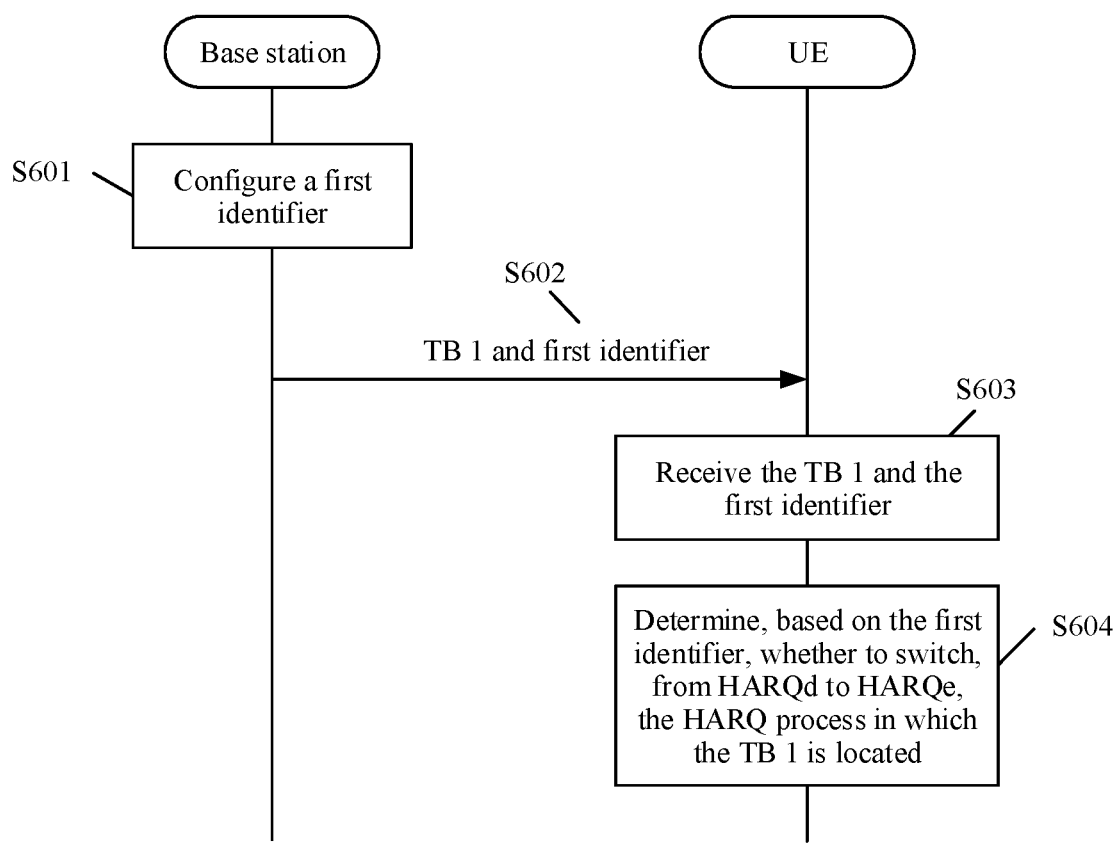
FIG. 6 is a schematic flowchart of a data transmission method according to an embodiment of this application.

The data transmission methods provided in the examples of this application may be applied to the network architecture shown in FIG. 4, to implement data transmission by using a terminal and/or a base station that have protocol stack layer structures shown in FIG. 5(a) and FIG. 5(b). To more clearly describe embodiments of this application, the following uses an example in which a transmit end is a network device (for example, a 4G base station, a 5G base station, a base station on a future communication network, a terminal that functions as a base station in D2D (device-to-device) communication or machine communication, or a satellite); a receive end is a terminal (for example, a UE, a handheld terminal, an in-vehicle terminal, a communication terminal in various forms on an access cellular or satellite communication network); and a plurality of existing HARQ processes include a HARQ process used to send a first transport block (or referred to as a TB 1). FIG. 6 is a schematic flowchart of a data transmission method according to an embodiment of this application. As shown in FIG. 6, the method may include S601 to S604.

S601: A base station configures a first identifier.

The first identifier is used to indicate whether to switch, from HARQd to HARQe, the HARQ process in which the TB 1 is located. The first identifier is occupied when the HARQ process uses HARQe.

It may be understood that, when the HARQ process is set to HARQe, the base station and the UE exchange a part of physical layer signaling, which is used to identify related information corresponding to transmission of a corresponding transport block. For example, during transmission of the TB 1, the base station may send corresponding DCI to the UE when sending the TB 1. The DCI may include configuration information in Table 1 related to the HARQ process, and is used to indicate, to the UE, information related to current data transmission. When the HARQ process is set to HARQd, a part of signaling (for example, an NDI) in the DCI becomes invalid. To be specific, values configured for the signaling may not affect corresponding data transmission. For example, when the HARQ process is set to HARQd, regardless of whether the NDI is flipped or not, data sent by the base station is newly transmitted data, and TBs received by the UE are also newly transmitted data. In embodiments of this application, any one or more bits in physical layer signaling that are invalid when the HARQ process is set to HARQd may be used as the first identifier, to indicate the UE whether to switch the HARQ process from HARQd to HARQe. In this case, when the UE needs to feed back an ACK/NACK, an ACK or a NACK may be fed back to the base station depending on whether the received transport block is successfully decoded. In this way, these bits in existing signaling can be reused. Signaling overheads are reduced. In addition, the HARQ status can be quickly changed, and configuration can be quickly completed.

For example, the base station may determine, based on a requirement of transmission of the TB 1 for a bit error rate, whether to switch a corresponding HARQ process from HARQd to HARQe. Certainly, the base station may further determine, based on another requirement, whether to switch the HARQ process from HARQd to HARQe. This is not limited in this embodiment of this application.

When the base station determines to switch, from HARQd to HARQe, the HARQ process in which the TB 1 is located, the base station may configure the first identifier to a corresponding status, for example, flip the first identifier, to indicate to switch, from HARQd to HARQe, the HARQ process in which the TB 1 is located. For another example, the base station may not flip the first identifier to indicate to switch, from HARQd to HARQe, the HARQ process in which the TB 1 is located. Both have the same effect.

When the base station determines not to switch, from HARQd to HARQe, the HARQ process in which the TB 1 is located, the base station may configure the first identifier to a corresponding status, for example, may not flip the first identifier, that is, the first identifier remains unchanged, to indicate not to switch, from HARQd to HARQe, the HARQ process in which the TB 1 is located. For another example, the base station may flip the first identifier, to indicate not to switch, from HARQd to HARQe, the HARQ process in which the TB 1 is located.

S602: The base station sends the TB 1 and the first identifier to the UE.

The base station may send the TB 1 to the UE, and may further send, to the UE, the first identifier used to indicate whether to switch the HARQ process from HARQd to HARQe. The TB 1 and the first identifier may be sent to the UE together, or may be separately sent to the UE. A sequence of the TB 1 and the first identifier may be flexibly set based on an actual situation. This is not limited in this embodiment of this application. For example, an example in which the first identifier is any one or more bits in the DCI is used. The base station may send both the TB 1 and the DCI carrying the first identifier to the UE, so that the UE may determine, based on the first identifier in the DCI, whether to switch, from HARQd to HARQe, the HARQ process corresponding to the TB 1.

S603: The UE receives the TB 1 and the first identifier.

S604: The UE determines, based on the first identifier, whether to switch, from HARQd to HARQe, the HARQ process in which the TB 1 is located.

The UE may receive the TB 1 and the first identifier on a downlink data transmission channel indicated by the HARQ process in which the TB 1 is located, for example, a physical downlink shared channel (PDSCH), where the TB 1 and the first identifier are sent by the base station.

The UE may determine, based on the first identifier, whether to switch, from HARQd to HARQe, the HARQ process in which the TB 1 is located.

When the UE determines to switch the HARQ process from HARQd to HARQe, the UE may feed back an ACK or a NACK to the base station based on a decoding status of the TB 1, so that the base station determines, based on the received ACK or NACK, whether the TB 1 is correctly decoded.

When the UE determines not to switch the HARQ process from HARQd to HARQe, the UE may determine that a next TB received from the HARQ process is newly transmitted data regardless of whether the TB 1 is correctly decoded. In addition, the UE does not need to feed back the ACK or the NACK to the base station based on the decoding status of the TB 1.

It should be noted that, before S601, the base station may set the HARQ process corresponding to the TB 1 to HARQd. In this embodiment of this application, before data transmission, the configuration of the HARQ process may be initialized. For example, the base station may set the HARQ process corresponding to the TB 1 to HARQd by using RRC signaling, or may set the HARQ process corresponding to the TB 1 to HARQd by using another method. This is not limited in this embodiment of this application. In addition, in a data transmission process, the base station may set any one or more HARQ processes to HARQe or HARQd by using the RRC signaling based on a requirement, so that the HARQ processes can be centrally managed.

To describe a configuration process of the HARQ process more clearly, the following uses an example in which the first identifier is an NDI to describe a configuration process in a scenario of data transmission by using a plurality of HARQ processes in parallel.

For example, the base station may set a HARQ process to HARQd by using RRC signaling, and indicate, by setting a flipping status of an NDI, the UE whether to switch the corresponding HARQ process from HARQd to HARQe.

In some embodiments, when the NDI is flipped, the NDI may be used to indicate to switch the corresponding HARQ process from HARQd to HARQe. Correspondingly, when the NDI is not flipped, the NDI may be used to indicate to maintain the HARQ process unchanged being HARQd. That is, when the base station determines to maintain a HARQ process unchanged being HARQd, the base station does not flip an NDI corresponding to data transmitted by using the HARQ process. Correspondingly, when the base station determines to switch a HARQ process from HARQd to HARQe, the base station flips an NDI corresponding to data transmitted by using the HARQ process.

Figure 7:
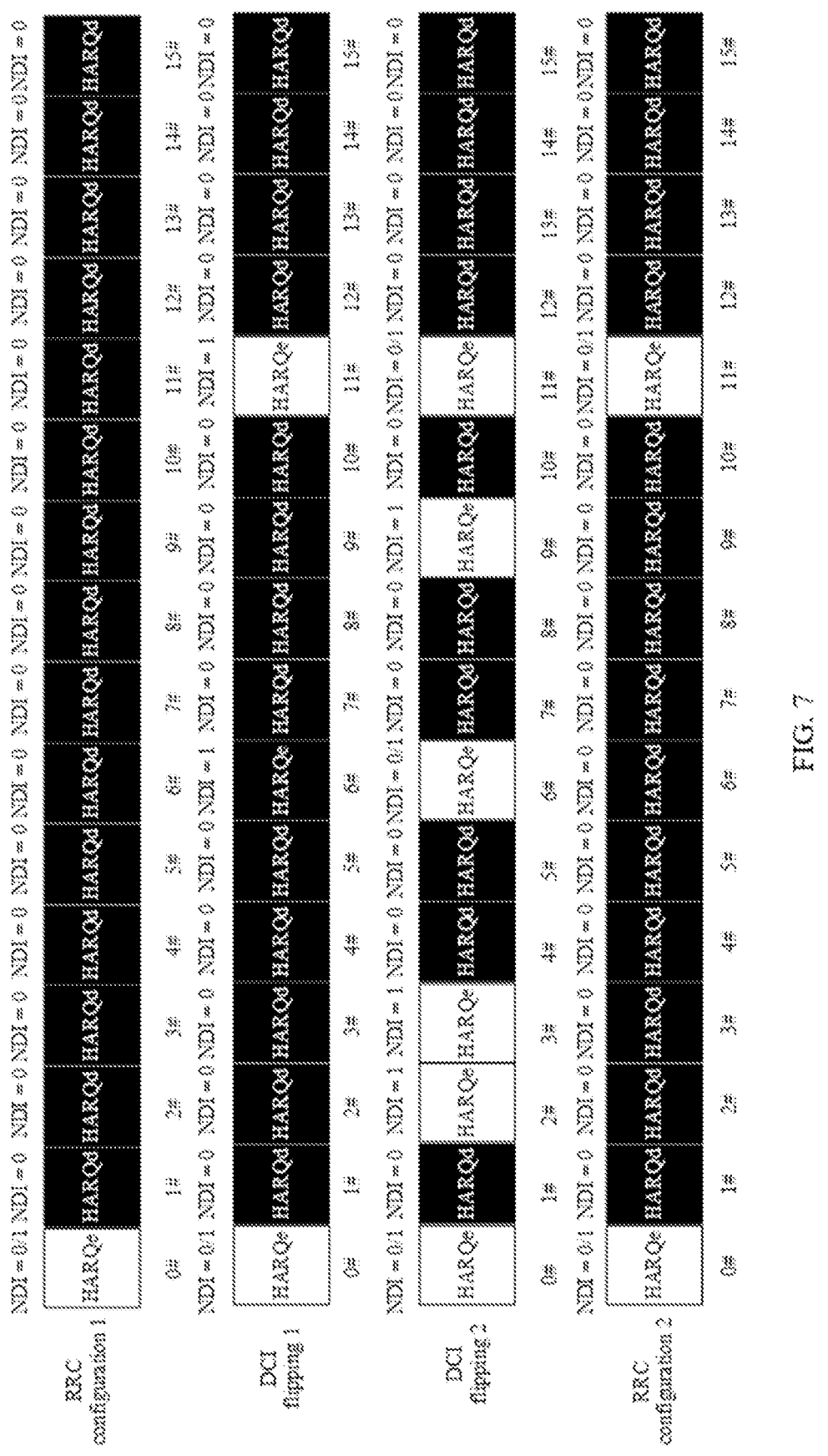

For example, for the configuration process, refer to FIG. 7. As shown in FIG. 7, there are 16 HARQ processes (for example, 16 HARQ processes in total from 0# to 15#) at the same time. When data transmission starts, 0# may be set to HARQe through RRC configuration 1, and other 1# to 15# are all set to HARQd. In this case, an NDI corresponding to data transmitted by using 0# is correspondingly configured based on new data transmission or retransmission. NDIs corresponding to data transmitted by using 1# to 15# may remain unchanged by default. For example, a default value of the NDI may be 0 shown in FIG. 7. As shown in FIG. 7, in a configuration process of NDI flipping 1, the base station flips, from 0 to 1, an NDI corresponding to data transmitted by using 11#, and a corresponding HARQ process is switched from HARQd to HARQe. Subsequently, the NDI corresponding to the data transmitted by using 11# is correspondingly configured based on new data transmission or retransmission. Similarly, in a configuration process of NDI flipping 2, the base station flips, to 1, NDIs corresponding to data transmitted by using 2#, 3#, 6#, and 9#, and corresponding HARQ processes are switched from HARQd to HARQe. Subsequently, the NDIs corresponding to the data transmitted by using 2#, 3#, 6#, and 9# are correspondingly configured based on new data transmission or retransmission. When the base station needs to centrally manage all HARQ processes, configuration may be performed by using RRC signaling. As shown in FIG. 7, the base station may perform RRC configuration 2, to set 0# and 11# to HARQe and set other 14 HARQ processes to HARQd.

In other embodiments, when the NDI is not flipped, the NDI may be used to indicate to switch the corresponding HARQ process from HARQd to HARQe. Correspondingly, when the NDI is flipped, the NDI may be used to indicate to maintain the HARQ process unchanged as HARQd. That is, when the base station determines to maintain a HARQ process unchanged as HARQd, the base station flips an NDI corresponding to data transmitted by using the HARQ process. Correspondingly, when the base station determines to switch a HARQ process from HARQd to HARQe, the base station does not flip an NDI corresponding to data transmitted by using the HARQ process.

Figure 8:
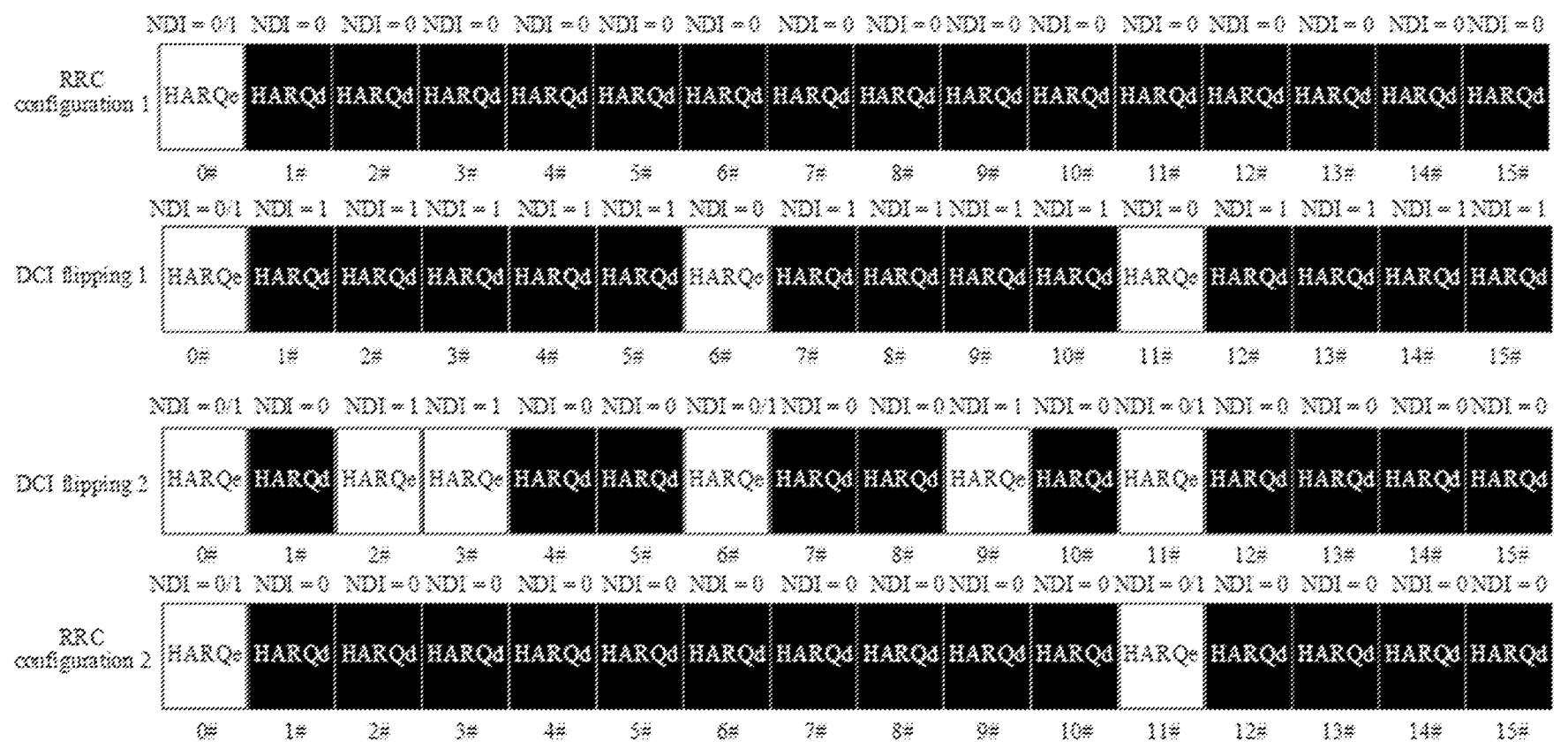

For example, for the configuration process, refer to FIG. 8. As shown in FIG. 8, there are simultaneously 16 HARQ processes (for example, 16 HARQ processes in total from 0# to 15#). When data transmission starts, 0# may be set to HARQe through RRC configuration 1, and other 1# to 15# are all set to HARQd. In this case, an NDI corresponding to data transmitted by using 0# is correspondingly configured based on new data transmission or retransmission. NDIs corresponding to data transmitted by using 1# to 15# may remain unchanged by default. For example, default value of the NDI may be 0 shown in FIG. 8. As shown in FIG. 8, in a configuration process of NDI flipping 1, the base station does not flip NDIs corresponding to data transmitted by using 6# and 11#, and corresponding HARQ processes are switched from HARQd to HARQe. Subsequently, the NDIs corresponding to the data transmitted by using 6# and 11# are correspondingly configured based on new data transmission or retransmission. Similarly, in a configuration process of NDI flipping 2, the base station does not flip NDIs corresponding to data transmitted by using 2#, 3#, and 9#, and corresponding HARQ processes are switched from HARQd to HARQe. Subsequently, the NDIs corresponding to the data transmitted by using 2#, 3#, and 9# are correspondingly configured based on new data transmission or retransmission. When the base station needs to centrally manage all HARQ processes, configuration may be performed by using RRC signaling. As shown in FIG. 8, the base station may perform RRC configuration 2, to set 0# and 11# to HARQe and set other 14 HARQ processes to HARQd.

It can be learned that, after the HARQ process in which the TB 1 is located is set to HARQe, the first identifier changes from invalid to valid, and is used to identify related data in a HARQe data transmission process. That is, after the HARQ process is set to HARQe, the first identifier cannot be used to indicate whether to change the HARQ process, for example, switch the HARQ process from HARQe to HARQd. Embodiments of this application further provide a plurality of methods, so that a HARQ process can be flexibly configured.

Figure 9:
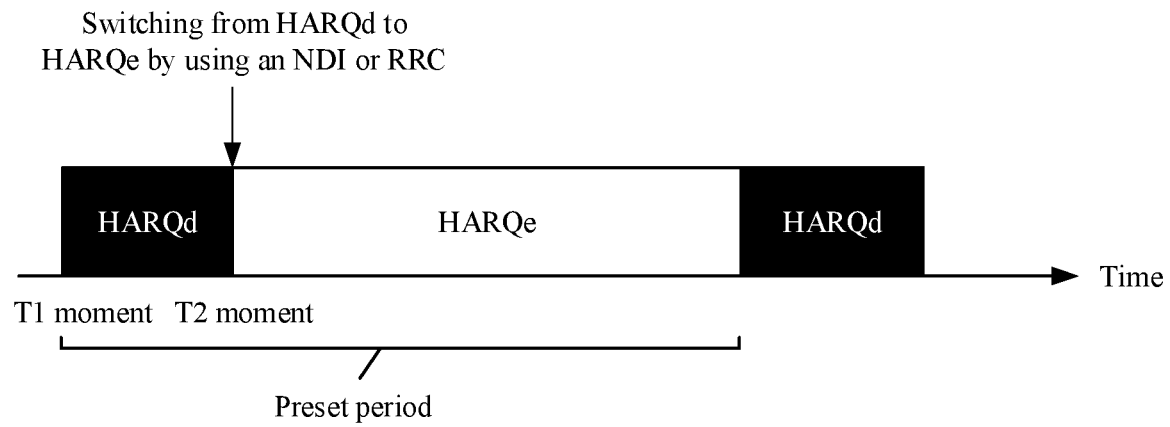
FIG. 9 is a schematic diagram of another configuration process of a HARQ process according to an embodiment of this application.

For example, in some embodiments, a HARQ process may start to support data transmission after initialization of the HARQ process is completed. In the process, the HARQ process may be configured by using a method such as the first identifier or RRC signaling. In this embodiment, a timer may be set to start timing from a moment at which initialization of the HARQ process is completed. After a preset periodicity, the HARQ process is restored to an initialization state, to implement periodic initialization of the HARQ process and improve system stability. For example, as shown in FIG. 9, the HARQ process is initialized to HARQd at a T1 moment, and timing starts from the T1 moment. It is assumed that the HARQ process is set to HARQe at a T2 moment in the preset periodicity, and the HARQ process is re-initialized as HARQd when timing of the timer reaches duration of the preset periodicity.

Figure 10:
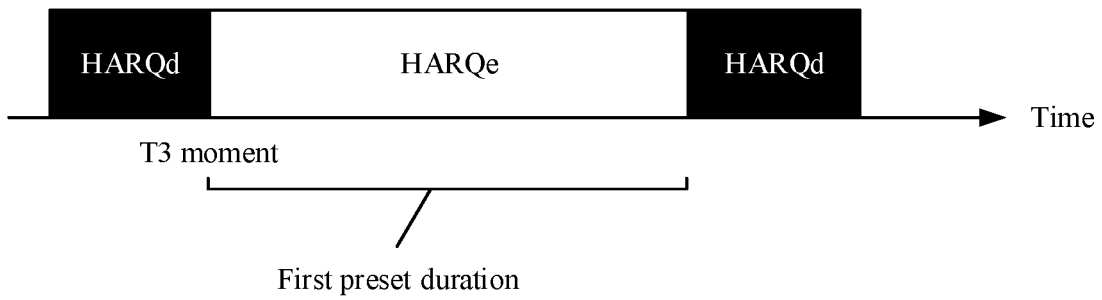
FIG. 10 is a schematic diagram of another configuration process of a HARQ process according to an embodiment of this application.

In other embodiments, the HARQ process is set to HARQd after first preset duration starting from a moment at which the HARQ process is set to HARQe. For example, as shown in FIG. 10, the HARQ process is switched from HARQd to HARQe at a T3 moment. A timer may be set to start timing from the T3 moment, and the HARQ process may be automatically switched from HARQe to HARQd after the first preset duration. The HARQ process may be set to HARQe by flipping (or not flipping) the first identifier, or by using RRC signaling. This is not limited in this embodiment of this application.

Figure 11:
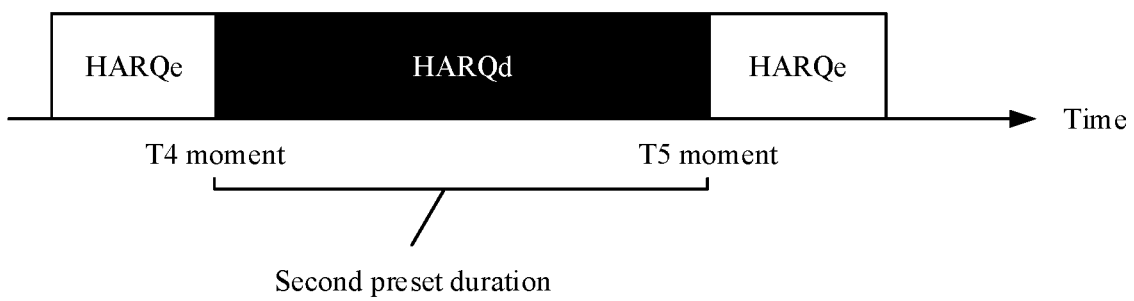
FIG. 11 is a schematic diagram of another configuration process of a HARQ process according to an embodiment of this application.

In other embodiments, the HARQ process remains unchanged as HARQd within second preset duration starting from a moment at which the HARQ process is set to HARQd. For example, as shown in FIG. 11, when the HARQ process is switched from HARQe to HARQd at a T4 moment, the HARQ process remains unchanged as HARQd within the second preset duration starting from the T4 moment until a T5 moment. From the T5 moment, the UE determines to switch the HARQ process to HARQe only when the UE receives the first identifier or another indication (for example, RRC signaling) that indicates to switch the HARQ process from HARQd to HARQe. In this case, the UE may not query and determine the first identifier within the second preset duration. This can effectively reduce a working load of the UE, and properly reduce a switching frequency of the HARQ process. This facilitates normal running of a system. The HARQ process may be set to HARQd by using RRC signaling, or may be configured by using another method. This is not limited in this embodiment of this application.

It should be noted that the preset periodicity in FIG. 9, the first preset duration in FIG. 10, and the second preset duration in FIG. 11 may be agreed upon in advance and preset in the transmit end and the receive end, or may be configured in real time by using a method such as sending RRC signaling. This is not limited in this embodiment of this application. In addition, the HARQ process is separately maintained on both sides of the transmit end and the receive end. The transmit end and the receive end may separately configure, according to the foregoing data transmission method, HARQ processes maintained by the transmit end and the receive end, to ensure that HARQ processes on the two sides are consistent. In this way, normal data transmission is ensured.

After the HARQ process is set to HARQe, the UE may feed back an ACK or a NCAK to the base station based on a decoding status of the TB 1, so that the base station performs a corresponding operation. For example, the UE may feed back an ACK to the base station when the TB 1 is successfully decoded. After receiving the ACK, the base station may perform new data transmission by using the HARQ process corresponding to the TB 1. The UE may feed back a NACK to the base station when the TB 1 fails to be decoded. After receiving the NACK, the base station may perform data retransmission by using the HARQ process corresponding to the TB 1. It should be noted that data retransmission may be asynchronous retransmission in this embodiment of this application. That is, retransmission of the TB 1 by using the HARQ process may occur at any moment. In this way, the base station can flexibly select a moment for data retransmission based on a status of a current transmission resource, to improve data transmission stability of the system.

In addition, in the foregoing example, an example in which the first identifier is an NDI is used for description. In embodiments of this application, another identifier in DCI may be used as the first identifier, or an identifier that is valid in a HARQe state but invalid in a HARQd state and that is in other signaling may be used as the first identifier. A size of bits occupied by the first identifier is not limited.

It should be noted that an example in which the base station determines and controls whether to switch the HARQ process is used for description in the foregoing description. In embodiments of this application, the UE and the base station may further trigger switching of the HARQ process based on a preset condition. For example, a threshold may be set for a quality of service (QoS) requirement in the UE and the base station. The UE and the base station both can configure a HARQ process for a data transmission process that meets the threshold requirement. For example, a first threshold may be set for a reliability requirement in QoS. When a reliability requirement for data transmission is higher than the first threshold, the UE and the base station both set a corresponding HARQ process to HARQe. On the contrary, when the reliability requirement for data transmission is lower than the first threshold, the UE and the base station both configure the corresponding HARQ process as HARQd. In this embodiment of this application, activating or deactivating the foregoing trigger condition may be configured by the base station by using an RRC message, or may be preset.

Certainly, a HARQ process may be configured by using one of the plurality of HARQ process configuration methods provided in embodiments of this application, or by using two or more of the methods. This is not limited in this embodiment of this application.

In this way, a HARQ process may be configured by using physical layer signaling (for example, an NDI in DCI) that is idle when the HARQ process is in HARQd, to implement fast and flexible configuration by using the physical layer signaling without occupying a new identifier resource. This improves a data transmission throughput.

Further, by using a configuration method in which RRC signaling is combined with a first identifier (for example, an NDI), the base station may implement adaptive configuration of the HARQ process at any moment, for example, when there is no data transmission, that is, no NDI transmission. In addition, first duration is set, so that the HARQ process can be restored to a HARQd state at a specific moment. This implements non-adaptive configuration of the HARQ process without additional signaling overheads. Second duration is set, so that frequent switching of the HARQ process does not occur. This improves system stability.

With reference to the descriptions in FIG. 6 to FIG. 11, it may be understood that, after receiving the first identifier (for example, an NDI) sent by an access network device (for example, the base station), the terminal may determine, based on a flipping status of the NDI, a mechanism for processing a status of the HARQ process.

In other embodiments of this application, after receiving the first identifier, the terminal may temporarily skip performing an indication, indicated by the first identifier, of whether to switch the status of the HARQ process. The terminal may further receive a second identifier, where the second identifier is used to indicate the first identifier whether to take effect. When the second identifier indicates the first identifier to take effect, the terminal may perform corresponding management on the HARQ process based on the indication, indicated by the first identifier, of whether to switch the status of the HARQ process.

For example, when the second identifier indicates the first identifier to take effect, the terminal may perform a corresponding operation based on the indication, indicated by the first identifier, of whether to switch the status of the HARQ process. For example, when the first identifier is used to indicate to switch, from HARQd to HARQe, the HARQ process in which the first transport block is located, the terminal switches, to HARQe, the status of the HARQ process in which the first transport block is located. For another example, when the first identifier is used to indicate to not switch, from HARQd to HARQe, the HARQ process in which the first transport block is located, the terminal maintains, as HARQd, the status of the HARQ process in which the first transport block is located.

With reference to the foregoing description, the first identifier in this example may be an NDI in DCI. In other embodiments, the first identifier may alternatively be sent by using media access control (MAC) control element (MAC CE) signaling. In other embodiments, the first identifier may alternatively be sent by using RRC signaling.

It should be noted that, in the foregoing example, description is provided by using an example in which the first identifier is used to indicate whether to switch the status of the HARQ process in which the first transport block is located (for example, from HARQd to HARQe). In other implementations of this embodiment, the first identifier may also be used to configure statuses of all or some HARQ processes for data transmission between the base station and the terminal. For example, an example in which the first identifier is sent by using RRC signaling, and there are 16 HARQ processes between the base station and the terminal is used. The base station may send the first identifier to the UE by using the RRC signaling. The first identifier may be used to indicate that a status of each HARQ process in all or some of the 16 HARQ processes is HARQd or HARQe. Alternatively, the first identifier may be used to indicate whether to switch a status of each HARQ process in all or some of the 16 HARQ processes from HARQd to HARQe. The terminal may store the first identifier, and continue performing transport block transmission based on a status of each of the 16 HARQ processes that currently take effect. The terminal may further receive a second identifier from the base station, where the second identifier may be used to indicate the first identifier whether to take effect or not. When the second identifier indicates the first identifier not to take effect, the terminal may continue performing transport block transmission based on a status of each of the 16 HARQ processes that currently take effect. When the second identifier indicates the first identifier to take effect, a status of a corresponding HARQ process is configured based on the first identifier. For example, if the status of each of the 16 HARQ processes is configured in the first identifier, when the second identifier indicates the first identifier to take effect, the terminal may configure, based on an indication of the first identifier, a status of each of the 16 HARQ processes as HARQd or HARQe.

The base station may configure the second identifier by configuring an idle field in DCI, by adding a new field in the DCI, based on a configuration separately sent by using a MAC CE, or based on a configuration separately sent by using RRC signaling.

It should be noted that, in another possible implementation of this embodiment, the terminal may alternatively perform a configuration of the first identifier according to a preset time rule when the terminal receives the second identifier, and the second identifier is used to indicate the first identifier to take effect. For example, in some embodiments, an example in which the second identifier is an idle field in the DCI is used. After receiving the DCI that carries the second identifier, the terminal may wait for preset duration, and configure a corresponding HARQ process based on the first identifier when the preset duration ends. The preset duration may be duration indicated by the DCI that carries the second identifier, or preset in the terminal, for example, a preset quantity of subframes, a preset quantity of frames, or a preset quantity of slots.

In this case, the terminal may determine, based on the second identifier, whether the first identifier takes effect, so that the terminal can more accurately configure a status of a HARQ process corresponding to the first identifier. In this way, flexibility of configuring a status of a HARQ process by the network for the terminal can be improved.

In addition, in the foregoing example, an example in which the base station configures a status of a corresponding HARQ process for a single terminal is used for description. In other embodiments of this application, the base station may alternatively configure HARQ processes corresponding to a plurality of terminals for the plurality of terminals simultaneously. For example, this solution may be applied to a scenario in which the base station separately sends the first identifier to the plurality of terminals by broadcasting, or the base station separately sends the first identifier to the plurality of terminals by providing a multicast service to the plurality of terminals.

For example, in some embodiments, the base station may pack first identifiers corresponding to the plurality of terminals into one broadcast message, and send the broadcast message through a broadcast channel. For example, the broadcast message may include a first identifier 1 corresponding to UE 1, a first identifier 2 corresponding to UE 2, a first identifier 3 corresponding to UE 3, and the like. After receiving the broadcast message, the terminal may parse the received broadcast message, to obtain the first identifier corresponding to the terminal. For example, the UE 1 may receive the broadcast message, and parse the broadcast message, to obtain the first identifier 1 corresponding to the UE 1. The UE 1 may determine, as the first identifier 1, a first identifier that corresponds to a UE ID of the UE 1 and that is in a plurality of first identifiers obtained through parsing. Alternatively, the UE 1 may parse the obtained broadcast message based on a characteristic parameter of the UE 1 (for example, the UE ID of the UE 1), to obtain the first identifier 1. Similarly, the UE 2 may receive the broadcast message, and parse the broadcast message, to obtain the first identifier 2 corresponding to the UE 2. The rest may be deduced by analogy. In other embodiments, the base station may distribute first identifiers corresponding to the plurality of terminals to each terminal by using a multicast data transmission channel corresponding to each terminal.

Therefore, a solution in which a status of a HARQ process may be configured for a plurality of terminals by distributing messages once on a network is provided. This can significantly reduce signaling overheads of the network in a process of configuring the status of the HARQ process.

The foregoing mainly describes, from the perspective of interaction between devices, the solutions provided in embodiments of this application. It may be understood that, to implement the foregoing functions, the terminal and the network device include a corresponding hardware structure and/or software module that is used to perform each function. A person of ordinary skill in the art should easily be aware that, in combination with the examples described in embodiments disclosed in this specification, units may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional modules may be divided on the terminal and the network device based on the foregoing method examples. For example, each functional module may be obtained through division based on each function, or two or more functions may be integrated into one processing module. The integrated module may be implemented in a form of hardware, or may be implemented in a form of a software functional module. Optionally, in embodiments of this application, division into modules is used as an example, and is merely logical function division. In actual implementation, another division manner may be used.

Figure 12:
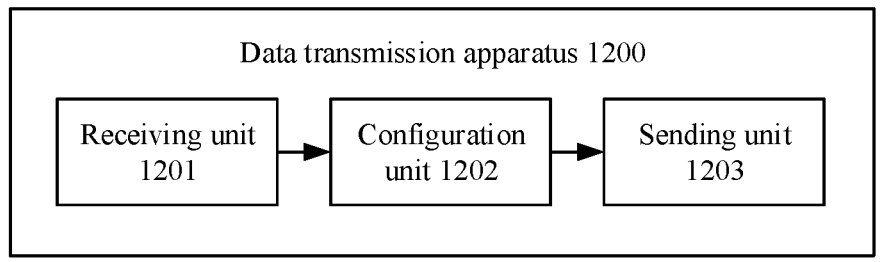
FIG. 12 is a schematic diagram of composition of a data transmission apparatus according to an embodiment of this application.

FIG. 12 shows a schematic diagram of composition of a data transmission apparatus 1200. The data transmission apparatus 1200 may be a terminal, a chip in the terminal, or a system on chip, and the data transmission apparatus 1200 may be configured to perform a function of the terminal in the foregoing embodiments. In an implementation, the data transmission apparatus 1200 shown in FIG. 12 includes a receiving unit 1201.

The receiving unit 1201 may receive a first transport block and a first identifier from a network device. The first identifier is used to indicate whether to switch, from non-hybrid automatic repeat request HARQ transmission to HARQ transmission, a HARQ process in which the first transport block is located. The first identifier is occupied when the HARQ process uses the HARQ transmission. For example, the receiving module 1201 may be configured to perform S603 shown in FIG. 6.

In a possible design, when the first identifier is flipped, the first identifier is used to indicate to switch the HARQ process from the non-HARQ transmission to the HARQ transmission; or when the first identifier is not flipped, the first identifier is used to indicate to switch the HARQ process from the non-HARQ transmission to the HARQ transmission.

In a possible design, the receiving unit 1201 is further configured to receive a radio resource control RRC message from the network device, where the RRC message is used to indicate that the HARQ process uses the non-HARQ transmission.

In a possible design, the apparatus further includes a configuration unit 1202. The configuration unit 1202 is configured to set the HARQ process to the non-HARQ transmission after a preset periodicity starting from a moment at which the RRC message is received.

In a possible design, the configuration unit 1202 is configured to set the HARQ process to the non-HARQ transmission after first preset duration starting from a moment at which the HARQ process is set to the HARQ transmission.

In a possible design, the configuration unit 1202 is configured to maintain the HARQ process as the non-HARQ transmission within second preset duration after the HARQ process is set to the non-HARQ transmission.

In a possible design, the first identifier is a new data indicator NDI.

In a possible device, the apparatus further includes a sending unit 1203. The sending unit is configured to: after the terminal receives the first transport block and the first identifier from the network device, when the first identifier is used to indicate to switch the HARQ process from the non-HARQ transmission to the HARQ transmission, send to the network device, a HARQ message used to indicate whether the first transport block is correctly decoded.

It should be noted that all related content of the steps in the foregoing method embodiments may be cited in function description of corresponding functional modules. Details are not described herein again. The data transmission apparatus provided in this embodiment of this application is configured to perform a function of the terminal in the foregoing communication method, and therefore, an effect the same as that in the foregoing communication method can be achieved. Optionally instead of mandatorily, it may be understood that, when necessary, the data transmission apparatus provided in embodiments of this application may include a processing module or a control module configured to support the receiving unit 1201 and/or the configuration unit 1202, and/or the sending unit 1203 in completing a corresponding function.

Figure 13:
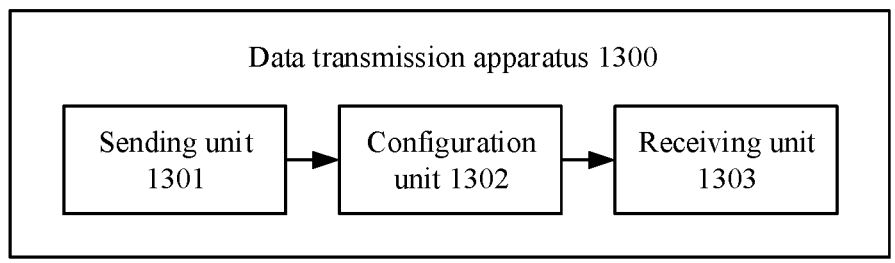
FIG. 13 is a schematic diagram of composition of another data transmission apparatus according to an embodiment of this application.

FIG. 13 shows a schematic diagram of composition of a data transmission apparatus 1300. The data transmission apparatus 1300 may be a chip in a network device or a system on chip, and the data transmission apparatus 1300 may be configured to perform a function of the network device in the foregoing embodiments. In an implementation, the data transmission apparatus 1300 shown in FIG. 13 includes a sending unit 1301.

The sending unit 1301 is configured to send a first transport block and a first identifier to a terminal, where the first identifier is used to indicate whether to switch a HARQ process from non-HARQ transmission to HARQ transmission. The first identifier is occupied when the HARQ process uses the HARQ transmission. For example, the sending unit 1301 may be configured to perform S602 shown in FIG. 6.

In a possible design, when the first identifier is flipped, the first identifier is used to indicate to switch the HARQ process from the non-HARQ transmission to the HARQ transmission; or when the first identifier is not flipped, the first identifier is used to indicate to switch the HARQ process from the non-HARQ transmission to the HARQ transmission.

In a possible design, the sending unit 1301 is further configured to send a radio resource control RRC message to the terminal, where the RRC message is used to indicate that the HARQ process uses the non-HARQ transmission.

In a possible design, the apparatus further includes a configuration unit 1302. The configuration unit 1302 is configured to set the HARQ process to the non-HARQ transmission after a preset periodicity starting from a moment at which the RRC message is sent.

In a possible design, the configuration unit 1302 is configured to set the HARQ process to the non-HARQ transmission after first preset duration starting from a moment at which the HARQ process is set to the HARQ transmission.

In a possible design, the configuration unit 1302 is further configured to maintain the HARQ process as the non-HARQ transmission within second preset duration after the HARQ process is set to the non-HARQ transmission.

In a possible design, the first identifier is a new data indicator NDI.

In a possible design, the apparatus further includes a receiving unit 1303. The receiving unit 1303 is configured to receive a HARQ message, where the HARQ message is used to indicate whether the first transport block is correctly decoded. The sending unit is further configured to: resend the first transport block to the terminal when the HARQ message is used to indicate the first transport block is not correctly decoded, or send a second transport block to the terminal when the HARQ message is used to indicate the first transport block is correctly decoded, where the second transport block is different from the first transport block.

It should be noted that all related content of the steps in the foregoing method embodiments may be cited in function description of corresponding functional modules. Details are not described herein again. The data transmission apparatus provided in this embodiment of this application is configured to perform a function of the network device in the foregoing communication method, and therefore, an effect the same as that in the foregoing communication method can be achieved. Optionally instead of mandatorily, it may be understood that, when necessary, the data transmission apparatus provided in embodiments of this application may include a processing module or a control module configured to support the sending unit 1301 and/or the configuration unit 1302, and/or the receiving unit 1303 in completing a corresponding function.

Figure 14:
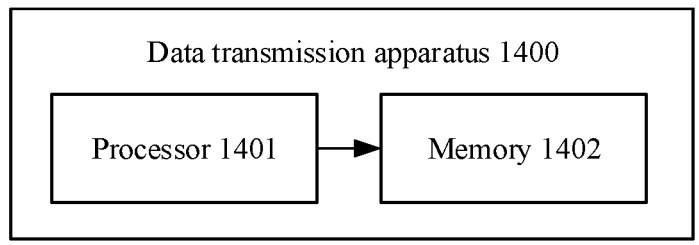
FIG. 14 is a schematic diagram of composition of another data transmission apparatus according to an embodiment of this application.

FIG. 14 is a schematic diagram of composition of another data transmission apparatus 1400. The data transmission apparatus 1400 may include a processor 1401 and a memory 1402. The memory 1402 is configured to store computer-executable instructions. For example, in some embodiments, when the processor 1401 executes the instructions stored in the memory 1402, the data transmission apparatus 1400 may be enabled to perform S603 shown in FIG. 6 and another operation that a terminal needs to perform.

Figure 15:
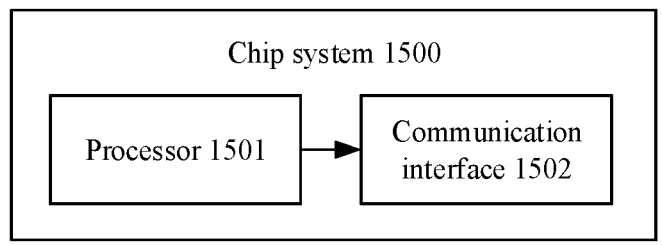
FIG. 15 is a schematic diagram of composition of a chip system according to an embodiment of this application.

FIG. 15 is a schematic diagram of composition of a chip system 1500. The chip system 1500 may include a processor 1501 and a communication interface 1502, configured to support a terminal in implementing the functions in the foregoing embodiments. For example, in some embodiments, the processor 1501 may communicate with another device (for example, a network device) other than the terminal through the communication interface 1502. In a possible design, the chip system 1500 further includes a memory, configured to store program instructions and data that are necessary for the terminal. The chip system may include a chip, or may include a chip and another discrete component.

Figure 16:
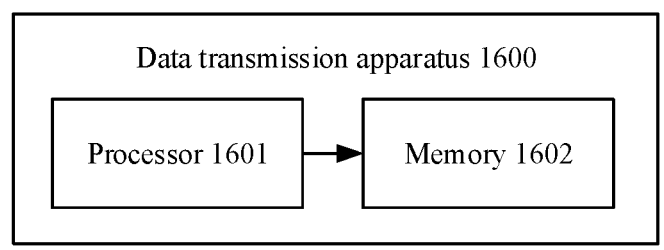
FIG. 16 is a schematic diagram of composition of another data transmission apparatus according to an embodiment of this application.

FIG. 16 is a schematic diagram of composition of another data transmission apparatus 1600. The data transmission apparatus 1600 may include a processor 1601 and a memory 1602. The memory 1602 is configured to store computer-executable instructions. For example, when the processor 1601 executes the computer-executable instructions stored in the memory 1602, the data transmission apparatus 1600 may be enabled to perform S602 shown in FIG. 6 and another operation that a network device needs to perform.

Figure 17:
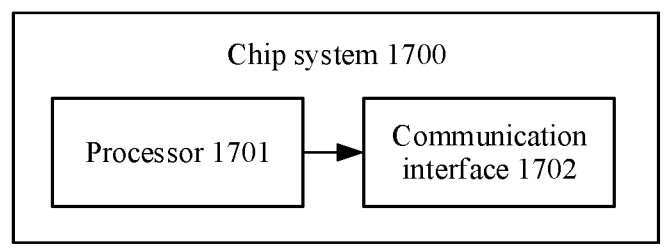
FIG. 17 is a schematic diagram of composition of another chip system according to an embodiment of this application.

FIG. 17 is a schematic diagram of composition of a chip system 1700. The chip system 1700 may include a processor 1701 and a communication interface 1702, configured to support a network device in implementing the functions in the foregoing embodiments. For example, the processor 1701 may communicate with another device (for example, a terminal) other than the network device through the communication interface 1702. In a possible design, the chip system further includes a memory, configured to store program instructions and data that are necessary for the network device. The chip system may include a chip, or may include a chip and another discrete component.

An embodiment of this application further provides a communication system. The communication system may include one or more terminals and/or one or more network devices. For example, the one or more terminals may be configured to perform S603 shown in FIG. 6 and another operation that a terminal needs to perform. The one or more network devices may be configured to perform S602 shown in FIG. 6 and another operation that a network device needs to perform.

It should be noted that all related content of the steps in the foregoing method embodiments may be cited in function description of corresponding functional modules. Details are not described herein again. The data transmission apparatus provided in this embodiment of this application is configured to perform a function of the terminal in the foregoing communication method, and therefore, an effect the same as that in the foregoing communication method can be achieved.

All or some of the functions, actions, operations, steps, and the like in the foregoing embodiments may be implemented by using software, hardware, firmware, or any combination thereof. When a software program is used to implement embodiments, all or some of embodiments may be implemented in a form of a computer program product.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A data transmission method, comprising:

receiving, by a data transmission apparatus, a radio resource control (RRC) message, wherein the RRC message is used to indicate that a hybrid automatic repeat request (HARQ) process uses a non-HARQ transmission; and receiving, by the data transmission apparatus, a first transport block and a first identifier, wherein the first identifier is used to indicate whether to switch the HARQ process of the first transport block from the non-HARQ transmission to a HARQ transmission, wherein the first identifier occupies one or more bits in downlink control information (DCI) without indicating transmission information associated with a transport block when the HARQ process uses the non-HARQ transmission.

2. The method according to claim 1, wherein in response to the first identifier being flipped, the first identifier indicates to switch the HARQ process from the non-HARQ transmission to the HARQ transmission.

3. The method according to claim 1, wherein after the data transmission apparatus receives the RRC message, the method further comprises:

setting, by the data transmission apparatus, the HARQ process to the non-HARQ transmission after a preset periodicity starting from a moment at which the RRC message is received.

4. The method according to claim 1, further comprising:
setting, by the data transmission apparatus, the HARQ process to the non-HARQ transmission after a first preset duration starting from a moment at which the HARQ process is set to the HARQ transmission.

5. The method according to claim 1, further comprising:
maintaining, by the data transmission apparatus, the HARQ process as the non-HARQ transmission within a second preset duration after the HARQ process is set to the non-HARQ transmission.

6. The method according to claim 1, wherein the first identifier is a new data indicator (NDI).

7. The method according to claim 1, wherein after the data transmission apparatus receives the first transport block and the first identifier, the method further comprises:
in response to the first identifier indicating switching the HARQ process from the non-HARQ transmission to the HARQ transmission, sending, by the data transmission apparatus, a HARQ message indicating whether the first transport block is correctly decoded.

8. The method according to claim 1,
wherein in response to the first identifier being not flipped, the first identifier indicates to switch the HARQ process from the non-HARQ transmission to the HARQ transmission.

9. A data transmission method, comprising:
sending, by the data transmission apparatus, a radio resource control (RRC) message, wherein the RRC message is used to indicate that a hybrid automatic repeat request (HARQ) process uses a non-HARQ transmission; and
sending, by the data transmission apparatus, a first transport block and a first identifier, wherein the first identifier occupies one or more bits in downlink control information (DCI) without indicating transmission information associated to a transport block when the HARQ process uses the non-HARQ transmission.

10. The method according to claim 9, wherein:
in response to the first identifier being flipped, the first identifier indicates to switch the HARQ process from the non-HARQ transmission to the HARQ transmission.

11. The method according to claim 9, wherein after the data transmission apparatus sends the RRC message, the method further comprises:
setting, by the data transmission apparatus, the HARQ process to the non-HARQ transmission after a preset periodicity starting from a moment at which the RRC message is sent.

12. The method according to claim 9, further comprising:
setting, by the data transmission apparatus, the HARQ process to the non-HARQ transmission after a first preset duration starting from a moment at which the HARQ process is set to the HARQ transmission.

13. The method according to claim 9, further comprising:
maintaining, by the data transmission apparatus, the HARQ process as the non-HARQ transmission within a second preset duration after the HARQ process is set to the non-HARQ transmission.

14. The method according to claim 9, wherein in response to the first identifier being used to indicate to switch the HARQ process from the non-HARQ transmission to the HARQ transmission, the method further comprises:

receiving, by the data transmission apparatus, a HARQ message, wherein the HARQ message indicates whether the first transport block is correctly decoded; and
resending, by the data transmission apparatus, the first transport block to a terminal based on the first transport block not being correctly decoded, or sending, by the data transmission apparatus, a second transport block to the terminal based on the first transport block being correctly decoded, wherein the second transport block is different from the first transport block.

15. The method according to claim 9, wherein:
in response to the first identifier being not flipped, the first identifier indicates to switch the HARQ process from the non-HARQ transmission to the HARQ transmission.

16. A data transmission apparatus, comprising:
at least one non-transitory memory configured to store instructions; and
at least one processor, wherein when executing the instructions, the at least one processor is configured to:
receive a radio resource control (RRC) message, wherein the RRC message is used to indicate that a hybrid automatic repeat request (HARQ) process uses a non-HARQ transmission; and
receive a first transport block and a first identifier, wherein the first identifier comprises one or more bits,
wherein the first identifier occupies one or more bits in the downlink control information (DCI) without indicating transmission information associated with a transport block when the HARQ process uses the non-HARQ transmission.

17. The apparatus according to claim 16, wherein:
in response to the first identifier being flipped, the first identifier is used to indicate to switch the HARQ process from the non-HARQ transmission to the HARQ transmission.

18. The apparatus according to claim 16, wherein the at least one processor is configured to:
set the HARQ process to the non-HARQ transmission after a preset periodicity starting from a moment at which the RRC message is received.

19. The apparatus according to claim 16, wherein the at least one processor is configured to:
set the HARQ process to the non-HARQ transmission after a first preset duration starting from a moment at which the HARQ process is set to the HARQ transmission.

20. The apparatus according to claim 16, wherein the at least one processor is configured to:
maintain the HARQ process as the non-HARQ transmission within a second preset duration after the HARQ process is set to the non-HARQ transmission.

21. The apparatus according to claim 16, wherein the first identifier is a new data transmission indicator (NDI).

22. The apparatus according to claim 16, wherein the at least one processor is configured to:
after the terminal receives the first transport block and the first identifier, in response to the first identifier indicating switching the HARQ process from the non-HARQ transmission to the HARQ transmission, send a HARQ message indicating whether the first transport block is correctly decoded.

23. The apparatus according to claim 16, wherein:
in response to the first identifier being not flipped, the first identifier is used to indicate to switch the HARQ process from the non-HARQ transmission to the HARQ transmission.

24. A data transmission apparatus, comprising:
at least one non-transitory memory configured to store instructions; and
at least one processor, wherein when executing the instructions, the at least one processor is configured to:
send a radio resource control (RRC) message, wherein the RRC message is used to indicate that a hybrid automatic repeat request (HARQ) process uses a non-HARQ transmission; and
send a first transport block and a first identifier, wherein the first identifier occupies one or more bits in downlink control information (DCI) without indicating transmission information associated to a transport block when the HARQ process uses the non-HARQ transmission.

25. The apparatus according to claim 24, wherein:
in response to the first identifier being flipped, the first identifier indicates to switch the HARQ process from the non-HARQ transmission to the HARQ transmission.

26. The apparatus according to claim 24, wherein the at least one processor is configured to:
set the HARQ process to the non-HARQ transmission after a preset periodicity starting from a moment at which the RRC message is sent.

27. The apparatus according to claim 24, wherein the at least one processor is configured to:
set the HARQ process to the non-HARQ transmission after a first preset duration starting from a moment at which the HARQ process is set to the HARQ transmission.

28. The apparatus according to claim 24, wherein the at least one processor is configured to:
maintain the HARQ process as the non-HARQ transmission within a second preset duration after the HARQ process is set to the non-HARQ transmission.

29. The apparatus according to claim 24, wherein:
in response to the first identifier being not flipped, the first identifier indicates to switch the HARQ process from the non-HARQ transmission to the HARQ transmission.

30. The apparatus according to claim 24, wherein in response to the first identifier being used to indicate to switch the HARQ process from the non-HARQ transmission to the HARQ transmission, the at least one processor is configured to:
receive a HARQ message, wherein the HARQ message indicates whether the first transport block is correctly decoded; and
resend the first transport block to a terminal based on the first transport block not being correctly decoded, or send a second transport block to the terminal based on the first transport block being correctly decoded, wherein the second transport block is different from the first transport block.

* * * * *